United States Patent
Lee et al.

(10) Patent No.: US 11,294,369 B2
(45) Date of Patent: Apr. 5, 2022

(54) UNMANNED AERIAL VEHICLE AND METHOD FOR CONTROLLING FLIGHT OF THE SAME

(71) Applicant: Samsung Electronics Co., Ltd., Suwon-si (KR)

(72) Inventors: Dong-Kyu Lee, Seoul (KR); Bo-Ram Namgoong, Suwon-si (KR); Ja-Min Goo, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 437 days.

(21) Appl. No.: 15/825,836

(22) Filed: Nov. 29, 2017

(65) Prior Publication Data

US 2018/0150073 A1    May 31, 2018

(30) Foreign Application Priority Data

Nov. 30, 2016  (KR) .................. 10-2016-0162333

(51) Int. Cl.
| | |
|---|---|
| *B64C 9/02* | (2006.01) |
| *B64C 27/08* | (2006.01) |
| *B64C 27/12* | (2006.01) |
| *B64D 45/00* | (2006.01) |
| *B64D 47/02* | (2006.01) |

(Continued)

(52) U.S. Cl.
CPC ......... *G05D 1/0038* (2013.01); *B64C 39/024* (2013.01); *B64D 45/00* (2013.01); *G05D 1/0033* (2013.01); *B64C 2201/027* (2013.01); *B64C 2201/127* (2013.01); *B64C 2201/146* (2013.01); *G06F 3/017* (2013.01); *G06T 7/70* (2017.01); *H04L 67/125* (2013.01); *H04N 5/2328* (2013.01); *H04N 7/185* (2013.01)

(58) Field of Classification Search
CPC ...... B64C 39/024; B64D 45/00; B64D 47/08; G03B 15/006; G06F 3/017; G06T 7/70; H04N 5/2328; H04N 7/185; H04W 4/00; H04W 4/029; H04W 4/80
See application file for complete search history.

(56) References Cited

U.S. PATENT DOCUMENTS

| | | | |
|---|---|---|---|
| 9,586,682 B2 * | 3/2017 | Kim ..................... | G03B 15/006 |
| 9,588,516 B1 * | 3/2017 | Gurel ..................... | G06T 5/002 |

(Continued)

FOREIGN PATENT DOCUMENTS

| | | |
|---|---|---|
| CN | 105334864 A | 2/2016 |
| CN | 105430286 A | 3/2016 |

(Continued)

OTHER PUBLICATIONS

Chinese Office Action dated Jan. 6, 2022, issued in Chinese Patent Application No. 201711247371.X.

*Primary Examiner* — Peter D Nolan
*Assistant Examiner* — Ce Li Li
(74) *Attorney, Agent, or Firm* — Jefferson IP Law, LLP

(57) ABSTRACT

An unmanned aerial vehicle (UAV) and a method for controlling the flight of the UAV are provided. The UAV provides a motion feedback corresponding to a user command received and a method for controlling the flight of the UAV. The UAV further provides a magnitude of motion feedback that is varied depending on the distance and/or direction between the user and the UAV and a method for controlling the flight of the UAV.

16 Claims, 13 Drawing Sheets

(51) Int. Cl.
  *B64D 47/08*   (2006.01)
  *G05D 1/00*   (2006.01)
  *G05D 1/10*   (2006.01)
  *G08B 7/06*   (2006.01)
  *B64C 39/02*   (2006.01)
  *G06T 7/70*   (2017.01)
  *G06F 3/01*   (2006.01)
  *H04L 67/125*   (2022.01)
  *H04N 5/232*   (2006.01)
  *H04N 7/18*   (2006.01)

(56) References Cited

U.S. PATENT DOCUMENTS

| | | | |
|---|---|---|---|
| 10,152,052 B1* | 12/2018 | Lu | G06F 3/0362 |
| 10,310,617 B2* | 6/2019 | Ekandem | G06F 3/017 |
| 2002/0183896 A1 | 12/2002 | Ogure et al. | |
| 2011/0221692 A1* | 9/2011 | Seydoux | G06F 3/04817 |
| | | | 345/173 |
| 2015/0316927 A1* | 11/2015 | Kim | H04L 67/12 |
| | | | 701/2 |
| 2015/0370250 A1* | 12/2015 | Bachrach | G05D 1/0094 |
| | | | 701/2 |
| 2016/0068267 A1* | 3/2016 | Liu | G05D 1/0061 |
| | | | 701/11 |
| 2016/0070265 A1* | 3/2016 | Liu | B64C 39/024 |
| | | | 701/3 |
| 2016/0327950 A1* | 11/2016 | Bachrach | G06F 3/00 |
| 2016/0364004 A1* | 12/2016 | Ekandem | G06F 3/017 |
| 2017/0036771 A1* | 2/2017 | Woodman | B64C 39/024 |
| 2017/0045892 A1* | 2/2017 | Wang | G05D 1/10 |
| 2017/0174344 A1* | 6/2017 | Lema | B64C 39/024 |
| 2017/0235308 A1* | 8/2017 | Gordon | B64C 39/024 |
| | | | 701/2 |
| 2017/0244937 A1* | 8/2017 | Meier | H04N 5/23216 |
| 2017/0251169 A1* | 8/2017 | Meier | H04N 5/23216 |
| 2017/0322563 A1* | 11/2017 | Kohstall | B64C 39/028 |
| 2018/0114058 A1* | 4/2018 | Kahn | G05D 1/0033 |
| 2018/0321676 A1* | 11/2018 | Matuszeski | G05D 1/0055 |
| 2019/0014253 A1* | 1/2019 | Guo | H04N 5/23203 |
| 2019/0176967 A1* | 6/2019 | Ohata | B64C 13/20 |

FOREIGN PATENT DOCUMENTS

| | | |
|---|---|---|
| CN | 105892474 A | 8/2016 |
| DE | 199 23 105 C1 | 7/2000 |
| KR | 10-2002-0067695 A | 8/2002 |
| WO | 2016/127192 A1 | 8/2016 |

\* cited by examiner

UNMANNED AERIAL VEHICLE AND METHOD FOR CONTROLLING FLIGHT OF THE SAME

CROSS-REFERENCE TO RELATED APPLICATION(S)

This application claims the benefit under 35 U.S.C. § 119(a) of a Korean patent application filed in the Korean Intellectual Property Office on Nov. 30, 2016 and assigned Serial number 10-2016-0162333, the entire disclosure of which is incorporated herein by reference.

TECHNICAL FIELD

The present disclosure relates to unmanned aerial vehicles (UAVs) and flight control methods for the same. More specifically, the present disclosure relates to UAVs that provide motion feedback corresponding to a UAV-user distance and a direction and methods for controlling the flight of UAVs.

BACKGROUND

Unmanned aerial vehicles (UAVs) capable of taking video (including images or audio) are recently being developed and come to the market. The term "unmanned aerial vehicle" encompasses drones.

UAVs may be manually taken off, landed, and flied under the control of a remote controller. Stand-alone UAVs do not require control by a remote controller for their flight.

UAVs may keep on hovering. A UAV that is flying or hovering may provide its status to the user by a light emitting diode (LED) flicker, an alarm (or notification) on the display of the remote controller, or an alert sound. A need exists for a method for providing the user with the state of the UAV depending on the UAV that is flying, ambient environment (e.g., nighttime or presence of an obstacle), and the distance and direction between the user and the UAV.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an apparatus and method for controlling flight of an unmanned aerial vehicle.

In accordance with an aspect of the present disclosure, an unmanned aerial vehicle (UAV) is provided. The UAV includes a transceiver connected with a remote controller, a driving unit including an electronic speed controller (ESC), a motor, and a propeller. The driving unit is configured to fly the UAV, and at least one processor configured to control the transceiver and the driving unit, wherein the at least one processor is further configured to control the driving unit to perform a motion feedback that represents a response corresponding to a user command received through the remote controller and a state of the UAV through a motion of the UAV according to the user command In accordance with another aspect of the present disclosure, the UAV further includes a positioning information receiver, wherein the at least one processor is further configured to produce positioning information of the UAV using the positioning information receiver corresponding to the received user command.

In accordance with another aspect of the present disclosure, the UAV further includes a camera, wherein the at least one processor is further configured to perform at least one of calculating a distance between the UAV, or a user by recognizing the user and capturing the user using the camera.

In accordance with another aspect of the present disclosure, the UAV further includes at least one sensor for detecting a state of the UAV, wherein the at least one processor is further configured to determine the state of the UAV using the at least one sensor.

In accordance with another aspect of the present disclosure, the at least one processor is further configured to determine a magnitude of a motion feedback corresponding to the state of the UAV and the positioning information of the UAV, and control the driving unit to perform the motion feedback corresponding to the magnitude of the motion feedback.

In accordance with another aspect of the present disclosure, a method for controlling flight of a UAV is provided. The method includes receiving a user command by the UAV that is flying, producing at least one of a direction and distance between a user and the UAV corresponding to the user command, determining a motion feedback corresponding to the user command, and performing the determined motion feedback within the user's view range.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, like reference numerals will be understood to refer to like parts, components, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The terms coming with ordinal numbers such as 'first' and 'second' may be used to denote various components, but the components are not limited by the terms. The terms are used only to distinguish one component from another. For example, "first component" as used herein may also be denoted as "second component." "Second component" may also be denoted as "first component." The term "and/or" may denote a combination(s) of a plurality of items as listed or any of the items.

The terms as used herein are provided merely to describe some embodiments thereof, but not intended to limit the present disclosure. It is to be understood that the singular forms "a," "an," and "the" include plural references unless the context clearly dictates otherwise. It will be further understood that the terms "comprise" and/or "have," when used in this specification, specify the presence of stated features, numbers, operations, components, parts, or combinations thereof but do not preclude the presence or addition of one or more other features, numbers, operations, components, parts, or combinations thereof The reference numbers in each figure denote members substantially performing the same function.

Figure 1A:
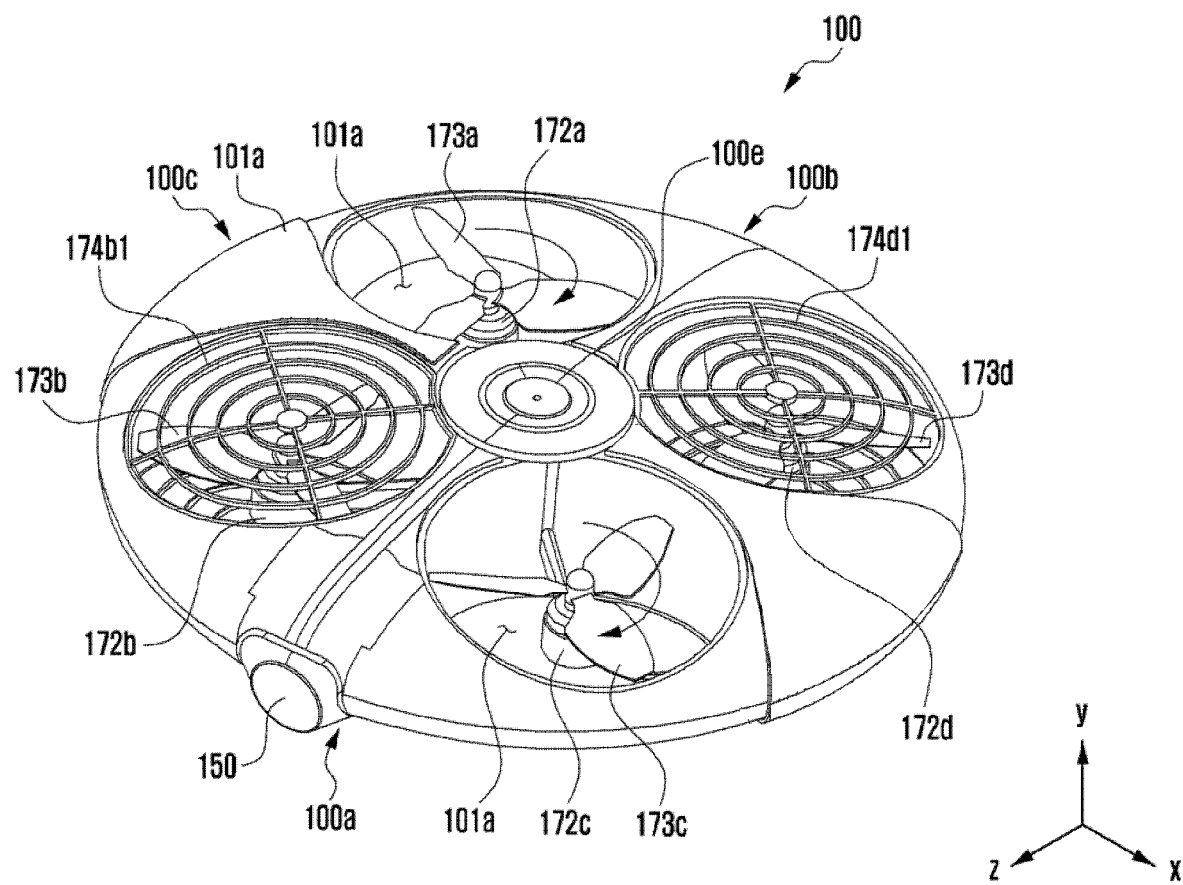
FIGS. 1A and 1B are views schematically illustrating an unmanned aerial vehicle (UAV) according to an embodiment of the present disclosure.
Figure 1B:
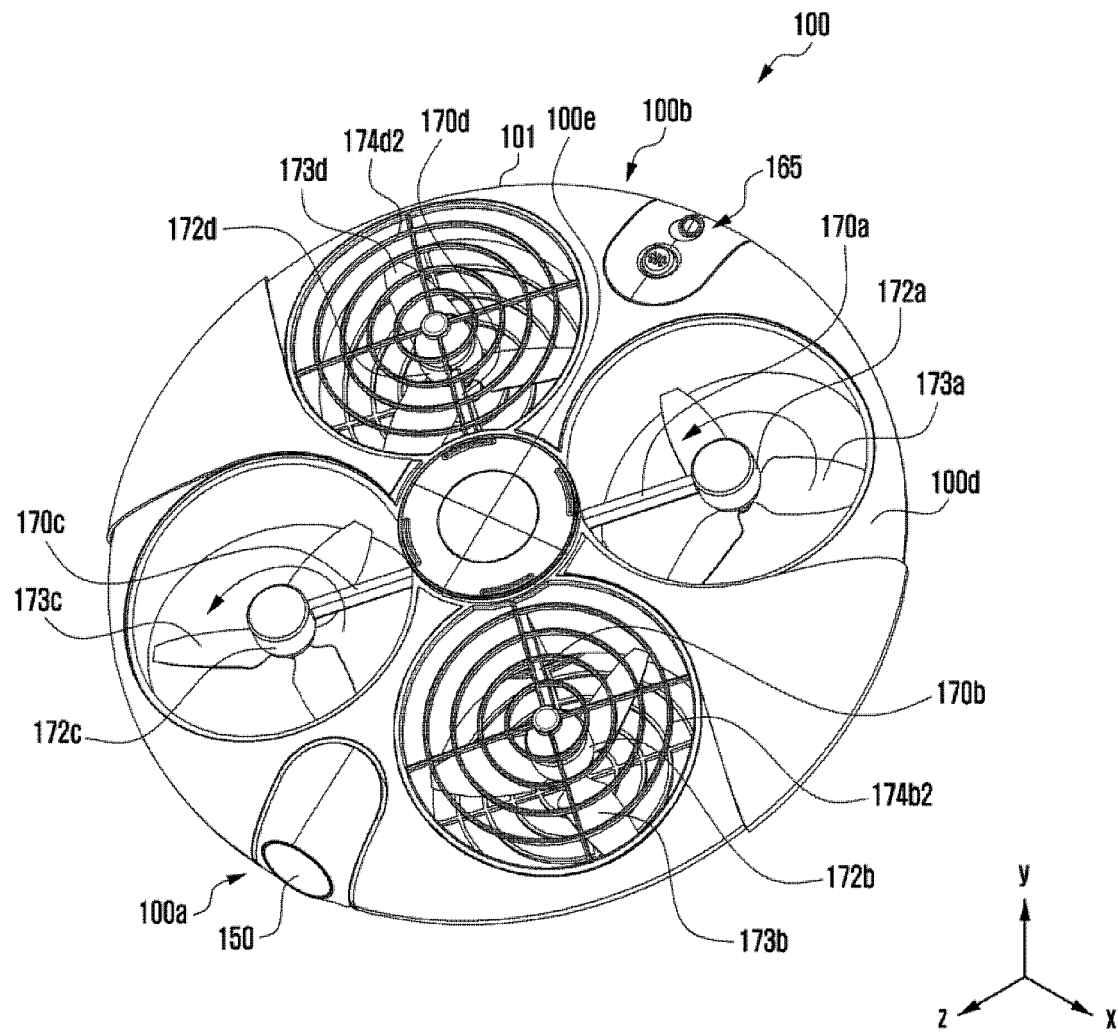

FIGS. 1A and 1B are views schematically illustrating an unmanned aerial vehicle (UAV) according to an embodiment of the present disclosure.

Referring to FIGS. 1A and 1B, a camera 150 is positioned on a front surface 100a of an unmanned aerial vehicle (UAV) 100. The camera 150 may be positioned in a lower portion of the bottom 100d (refer to FIG. 1B) of the UAV 100 or the front surface 100a of the UAV 100. The UAV 100 may further include a gimbal (not shown) that keeps the camera 150 at a preset angle (or in a present direction) using a sensor (not shown), separately from the movement (e.g., flight) of the UAV.

The UAV 100 includes a housing 101 having a frame (not shown), one or more motors 172 (e.g., 172a, 172b, 172c, 172d), and one or more propellers 173 (e.g., 173a, 173b, 173c, 173d) corresponding to the number of the motors 172. A main board (not shown) may be positioned in a central portion 100e of the UAV 100. A battery 195 (see FIG. 2) may be positioned facing the main board which is positioned in the central portion 100e of the UAV 100.

The housing 101 receives the frame (not shown), the motors 172, and the propellers 173 which corresponds to the number of the motors 172. The housing 101 has openings 101a corresponding to the number of the propellers 173. The UAV 100 may include the frame (not shown), the motors 172, and the propellers 173, but not the housing 101.

The housing 101 may be formed of lightweight plastic (or partially including a lightweight metal). For example, the housing 101 may be formed of wood, lightweight metal, polypropylene, or acrylonitrile butadiene styrene resin (ABS) resin. The above-listed materials used for the housing 101 are merely an example, but embodiments of the present disclosure are not limited thereto.

The UAV 100 may include one or more (e.g., two, three, four, six, eight, or more) propellers 173. The UAV 100 may include motors corresponding to the number of propellers 173.

Although the UAV 100 is shown to include four propellers and four motors in the instant embodiment, embodiments of the present disclosure are not limited thereto.

The UAV 100 may further include covers 174 (e.g., 174b1, 174b2, 174d1, 174d2) to protect the propellers 173 in the openings 101a. The covers 174 may be positioned over or under the propellers 173 in the openings 101a. The number of the covers 174 may be the same or smaller than the number of the propellers 173. The covers 174 includes openings to permit airflow therethrough as illustrated in FIGS. 1A and 1B.

FIG. 1B shows the bottom 100d of the UAV 100. An optical flow sensor (or an optical flow camera) 165 may be positioned on the bottom 100d of the UAV 100, which is used to keep the UAV 100 hovering in the current position. A landing gear (not shown) may be coupled to the bottom 100d of the UAV 100. According to an embodiment of the present disclosure, the camera may be mounted on the bottom 100d of the UAV 100. The camera, along with the gymbal or gimbal (not shown), may be mounted on the bottom 100d of the UAV 100.

Figure 2:
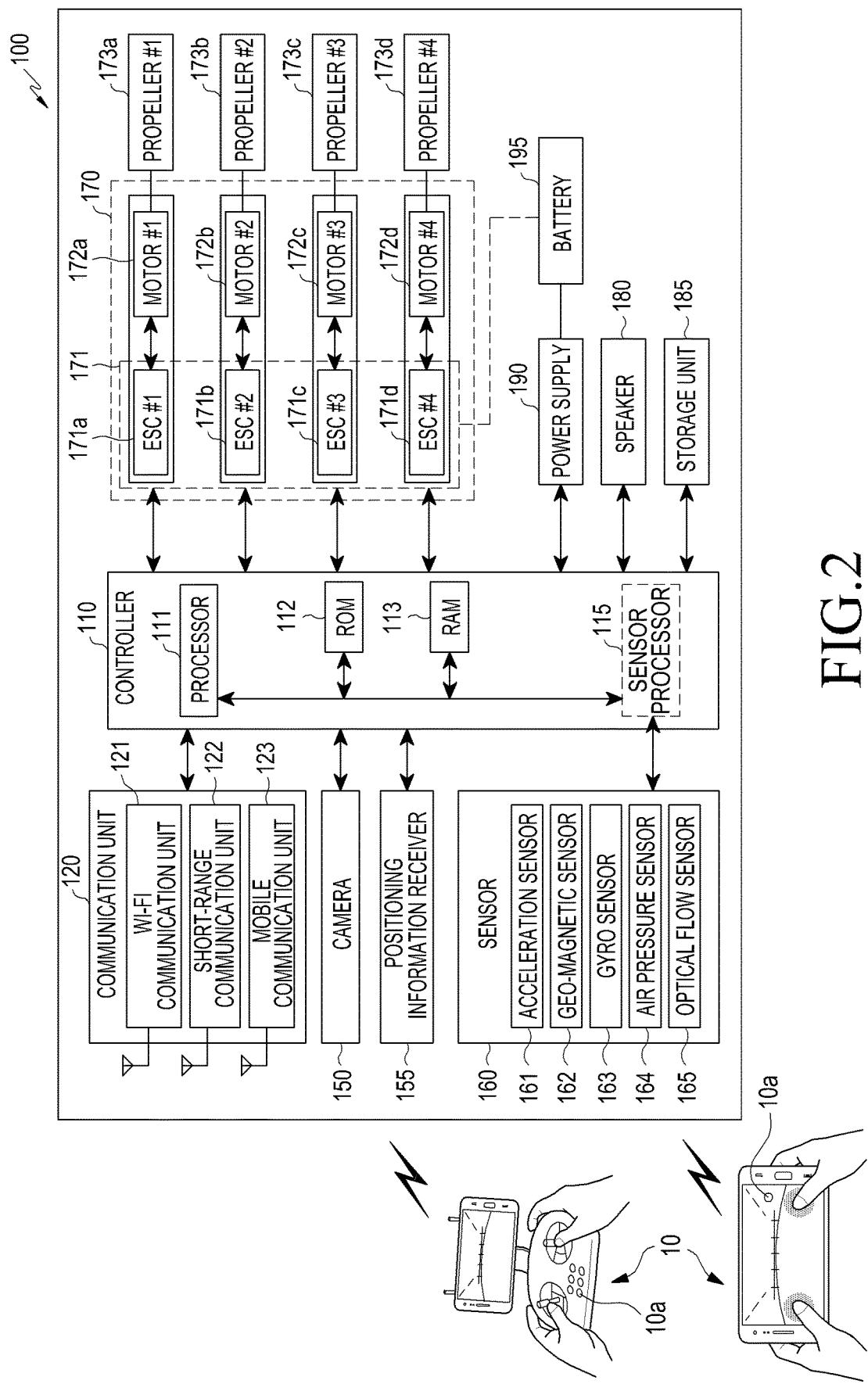
FIG. 2 is a block diagram schematically illustrating a UAV according to an embodiment of the present disclosure.

FIG. 2 is a block diagram schematically illustrating a UAV according to an embodiment of the present disclosure.

Referring to FIGS. 1A, 1B and 2, the UAV 100 may functionally connect with a remote controller 10 or a server (or a cloud server) using a communication unit 120 (e.g., a transceiver).

The UAV 100 may transmit or receive flight information (or image capture data including video data captured) through the communication unit 120 to or from the outside of the UAV.

The UAV 100 may include a controller 110 (e.g., at least one processor), the communication unit 120 (e.g., a transceiver), a camera 150, a positioning information receiver 155, a sensor 160, a driving unit 170, a speaker 180, a storage unit 185, a power supply 190, and a battery 195.

The controller 110 may include a processor (e.g., at least one flight processor) 111. The controller 110 may further include a read-only memory (ROM) 112 storing a control program to control the UAV 100 and a random-access memory (RAM) 113 used as a storage area for flight control information, flight information, or capture data received from the outside of the UAV 100 or various tasks (e.g., delivery, racing, or crop dusting) corresponding to the flight of the UAV 100.

The controller 110 may collect flight information and control the rotational speed (e.g., revolutions per minute (RPM)) of the motor 172 to detect and correct the posture of the UAV 100 using the sensor 160. The controller 110 may calculate the position of the UAV 100 using the positioning information receiver 155 and monitor the system status of the UAV 100.

The controller 110 may control the flow of signals between the internal components of the UAV 100 and the operation (e.g., takeoff, landing, flight, or hovering) of the UAV 100 and process data. The controller 110 may control the supply of power to the internal components (120 to 185) using the power supply 190.

The processor 111 may further include a sensor processor 115 that determines (or calculates) the flight state or ambient environment of the UAV 100 using analog (or digital) data received from one or more sensors of the UAV 100. The processor 111 may further include a communication processor (not shown) to control communication between the UAV 100 and the outside.

The processor 111 may be implemented in a system on chip (SoC) including a core (not shown) and the sensor processor 115. The processor 111 may be implemented as a built-in processor that includes the functions and operations of the sensor processor 115. The processor 111 may be a single-core, dual-core, triple-core, or quad-core processor or a processor including more multiple cores. The processor 111, the ROM 112, and the RAM 113 may interconnect with each other.

The controller 110 may control the communication unit 120, the camera 150, the positioning information receiver 155, the sensor 160, the driving unit 170, the speaker 180, the storage unit 185, and the power supply 190.

According to an embodiment of the present disclosure, a controller (or a processor) may control a communication unit connected with a remote controller and a driving unit including an electronic speed controller (ESC), a motor, and a propeller and operated to fly the UAV. The controller (e.g., at least one processor) controls the communication unit and the driving unit. The controller (or processor) controls the driving unit to perform a motion feedback that represents a response corresponding to a user command received through the remote controller and a state of the UAV through a motion of the UAV according to the user command According to an embodiment of the present disclosure, the processor (or controller) may further control a positioning information receiver, wherein the processor (or controller) may perform control to produce positioning information of the UAV using the positioning information receiver corresponding to the received user command According to an embodiment of the present disclosure, the processor may further control a camera, wherein the processor may perform control to perform at least one of calculating a distance between the UAV and a user by recognizing the user and capturing the user using the camera.

According to an embodiment of the present disclosure, the processor may further control at least one sensor for detecting a state of the UAV, wherein the processor may determine the state of the UAV using the at least one sensor.

According to an embodiment of the present disclosure, the processor may determine a magnitude of a motion feedback corresponding to the state of the UAV and the positioning information of the UAV and control the driving unit to perform the motion feedback corresponding to the magnitude of the motion feedback.

According to an embodiment of the present disclosure, the processor may control the driving unit to provide the motion feedback within the user's view range according to the magnitude of the motion feedback.

According to an embodiment of the present disclosure, the processor may vary the magnitude of the motion feedback corresponding to the distance between the remote controller and the UAV.

According to an embodiment of the present disclosure, when the determined direction between the remote controller and the UAV is out of a user's view range, the processor may control the driving unit to move the UAV to a position within a user's view range.

According to an embodiment of the present disclosure, the processor may provide an additional feedback corresponding to performing the motion feedback, and wherein the additional feedback may include at least one of flickering a light emitting diode (LED) and outputting an alert sound through a speaker.

According to an embodiment of the present disclosure, the processor may perform control to transmit a response corresponding to performing the motion feedback through the communication unit to the remote controller.

According to an embodiment of the present disclosure, the processor may control the driving unit to enable the UAV to ascend, descend, turn, flip, inclinedly ascend, inclinedly descend, or move corresponding to one of text including a letter and an emoticon according to the motion feedback.

According to an embodiment of the present disclosure, the processor may perform control to receive a user gesture corresponding to the user command through the camera.

As used herein, the term "controller of UAV 100" may mean that the controller includes the processor 111, the ROM 112, and the RAM 113. As used herein, the term "controller of UAV" may mean that the controller includes the processor 111, the sensor processor 115, the ROM 112, and the RAM 113. The term "controller of UAV" may also mean the processor (or flight processor) 111.

The communication unit 120 may connect with the outside of the UAV through a communication network using one or more antennas under the control of the controller 110. The communication unit 120 may transmit flight information and capture data of the UAV 100 to the outside under the control of the controller 110. The communication unit 120 may receive flight control information from the outside (the remote controller 10 or a server) under the control of the controller 110.

The communication unit 120 may include a Wi-Fi communication unit 121, a short-range communication unit 122, and/or a mobile communication unit 123.

The Wi-Fi communication unit 121 and/or the short-range communication unit 122 may connect with the remote controller 10 or a server (not shown) using one or more antennas under the control of the controller 110. The Wi-Fi communication unit 121 may support, e.g., Wi-Fi communication. The short-range communication unit 122 may include, e.g., Bluetooth (BT) communication, bluetooth low energy (BLE) communication, infrared communication (IrDA), ultra-wideband (UWB) communication, magnetic secure transmission (MST) and/or near-field communication (NFC).

The mobile communication unit 123 may connect with the remote controller 10 or a server (not shown) through a mobile communication network using one or more antennas under the control of the controller 110.

The UAV 100 may include one or a combination of the Wi-Fi communication unit 121, the short-range communication unit 122, and the mobile communication unit 123 depending on the structure and/or function.

As used herein, the term "communication unit" may mean that the communication unit includes the Wi-Fi communication unit 121, the short-range communication unit 122, and/or the mobile communication unit 123.

The camera 150 may capture a still image or video under the control of the controller 110. The camera 150 may include an auxiliary light source (e.g., a flash (not shown)) to provide light necessary for image capture.

The UAV 100 may include the front camera 150 and an additional camera (not shown) that is positioned adjacent to the camera 150, wherein the distance between the respective optical axes of the front camera 150 and the additional camera (not shown) may be larger than 3 mm and smaller than 80 mm, for example. The camera 150 and the additional camera may be implemented in a single unit. The controller 110 may capture a three-dimensional (3D) still image or 3D video using the camera 150 and the additional camera.

The UAV 100 may include a gymbal (not shown) that is attached to the camera 150 to obtain video data in an anti-shake and stable manner The gymbal may include, e.g., a three-axis gymbal. The gymbal (not shown) may include one or more motors (not shown) to adjust the angle of the camera 150. The gymbal (not shown) may further include a separate sensor (not shown) corresponding to the driving of the camera and/or the rotation of the motor.

The controller 110 may capture the user's face into an image using the camera 150. The controller 110 may recognize the user's face and calculate the distance between the user and the UAV 100 using the size of the user's face.

The positioning information receiver 155 periodically receives signals (e.g., satellite trajectory information, satellite time information, and navigation messages) from a plurality of satellites around the earth. The positioning information receiver 155 may be positioned on the top 100*c* of the UAV 100. The positioning information receiver 155 may be positioned in a central portion 100*e* of the top 100*c* of the UAV 100.

The UAV 100 may calculate the position of the UAV 100 and each satellite (not shown) using signals received from the plurality of satellites and calculate the distance using time differences in transmission/reception. The UAV 100 may calculate each of the current position, current time, altitude, or traveling speed of the UAV 100 using triangulation. The UAV 100 may calculate each of the current position, current time, altitude, or traveling speed of the UAV 100 using the positioning information receiver 155.

The UAV 100 may correct the position (e.g., in an auto return mode for returning to the hovering or takeoff position) using the calculated position or traveling speed.

The UAV 100 may be left in the current position (or a preset position received from the remote controller 10) (e.g., hovering) using the positioning information receiver 155 and an optical flow sensor 165 having a camera and an ultrasound wave sensor). For example, the UAV 100 may remain in the current position and altitude by restricting its movement (or rotation) due to an external influence (e.g., wind, rain, or snow) or an error in the internal control (e.g., motor control) using the optical flow sensor 165.

The sensor 160 may detect the flight state (or state) of the UAV 100 and/or ambient environment. The sensor 160 may detect a physical quantity corresponding to the UAV 100 and/or the ambient environment. The sensor 160 may convert the detected physical quantity into an electrical signal and output the electrical signal to the controller (110, 111, or 115).

The sensor 160 may include an acceleration sensor 161 to measure the acceleration of the UAV 100, a geomagnetic sensor (or magnetometer) 162 to detect the direction of the UAV 100 with respect to the magnetic north, a gyro sensor 163 to detect the rotational angular speed of the UAV 100, an air pressure sensor (or barometer) 164 to detect the current altitude of the UAV 100, and/or the optical flow sensor 165.

The controller 110 may produce the flight state of the UAV 100 using the sensor 160. The flight state of the UAV 100 may include a rotational state and a translational state. The rotational state may mean yaw, pitch, and roll. The rotational state may be detected by the acceleration sensor 161, the geo-magnetic sensor 162, and/or the gyro sensor 163.

The translational state may mean longitude, latitude, altitude, and speed. The translational state may be detected by the positioning information receiver 155 and the air pressure sensor 164.

The UAV 100 may fly using the produced flight state. The controller 110 may output a pulse width modulation (PWM) to drive the driving unit 170 corresponding to the obtained flight state.

The driving unit 170 enables the UAV 100 to take off, land, or fly corresponding to the PWM signal received from the controller 110. The driving unit 170 may include an electronic speed controller (ESC) 171, which may include ESC #1 171*a*, ESC #2 171*b*, ESC #3 171*c* and ESC #4 171*d*), a motor 172 (which may include MOTOR #1 172*a*, MOTOR #2 172*b*, MOTOR #3 172*c*, and MOTOR #4 172*d*), and a propeller 173 (which may include PROPELLER #1 173*a*, PROPELLER #2 173*b*, PROPELLER #3 173*c*, AND PROPELLER #4 173*d*), as illustrated in FIG. 2.

The ESC 171 may control, e.g., change, the rotational speed of the motor 172. The ESC 171 may control (e.g., accelerate, decelerate, stop, rotate, or reverse-rotate) the motor 172 according to the received PWM signal. The ESC 171 may correspond (or control) one motor 172. One ESC may correspond (or control) a plurality of (e.g., two, three, four, or more) motors.

The ESC 171 may be positioned in an arm 170 (see FIG. 1B) of the UAV 100, between the arm 170 and the central portion 100*e*, or inside the central portion 100*e* of the UAV 100. The ESC 171 may be positioned on the main board (not shown) inside the central portion 100*e* of the UAV 100.

The ESC 171 may include a battery eliminator circuit (BEC) that converts a higher voltage (e.g., 11.1V or higher, which may differ), which comes from the battery 195, into a lower voltage (e.g., 5V, which may differ) necessary for driving the motor. The ESC 171 may also include an external BEC and an optoisolator (OPTO)-type ESC (not shown) that converts a signal received from the controller 110 into light.

The ESC 171 may convert direct current (DC) power from the battery 195 into alternating current (AC) power and supply the AC power to the motor 172. The controller 110 may convert DC power from the battery 195 into AC power and supply the AC power to the motor 172 using the power supply 190.

The motor 172 (e.g., 172*a*, 172*b*, 172*c*, 172*d*) may be driven (e.g., rotated, stopped, accelerated, or decelerated) by the ESC 171. The motor 172 may be positioned in an end of the arm 170 (e.g., 170*a*, 170*b*, 170*c*, 170*d*) of the UAV 100. The motor 172 may include a blushless DC (BLDC) motor.

When the UAV 100 is a quadrotor, the UAV 100 may include four motors 172. Two (e.g., 172*a* and 172*c*) of the four motors 172*a* to 172*d* may be rotated clockwise. The other two (e.g., 172*b* and 172*d*) may be rotated counter-clockwise. The direction of rotation of the motors 172 may be varied corresponding to the number of the motors 172 applied to the UAV 100.

The propeller 173 coupled to the shaft of the motor 172 may be rotated along the direction in which the shaft of the motor 172 rotates. The UAV 100 may be flown by the rotating propeller 173. The UAV 100 may hover, rotate clockwise (yaw right) or counterclockwise (yaw left), move forwards (pitch down) or backwards (pitch up), moves left (roll left) or right (roll right), ascend, or descend. The UAV 100 may be rendered to hover, rotate clockwise or counterclockwise, move forwards or backwards, left or right, ascend, or descend by the motor 172 and the propeller 173 that are rotated corresponding to flight control information from the remote controller 10.

The speaker 180 outputs a sound corresponding to the state (e.g., power on/off, flight, encounter with an obstacle, an internal error, or low battery) of the UAV 100 under the control of the controller 110. One or more speakers 180 may be positioned on the front surface 100a, rear surface 100b, and/or the bottom 100d of the UAV 100.

The storage unit 185 may store signals or data input/output corresponding to the operation of the components 120 to 190 under the control of the controller 110. The storage unit 185 may store a control program for controlling the UAV 100 or the controller 110. The storage unit 185 may also store flight control information (e.g., flight, stop, rotation, or hovering) received from the outside (or the remote controller 10 or a server), electrical signals received from the sensor 160, flight information (e.g., position, speed, and remaining battery) of the UAV 100, control information of the camera 150, or video data (including image or audio data) captured by the camera 150.

According to an embodiment of the present disclosure, the term "storage unit" may mean that the storage unit includes the storage unit 185, the ROM 112 or RAM 113 in the controller 110, or a memory card (e.g., a micro secure digital (SD) card (not shown)) mounted in the UAV 100. The storage unit 185 may include a non-volatile memory, a volatile memory, a hard disk drive (HDD) or a solid state drive (SSD).

The power supply 190 may supply power from the battery 195 to the components 120 to 190 of the UAV 100 under the control of the controller 110. The power supply 190 may charge one or more batteries 195 under the control of the controller 110. The controller 110 may convert DC power from the battery 195 into AC power and supply the AC power to the motor 172 using the power supply 190.

The battery 195 may include a battery pack. The battery 195 may be positioned in the central portion 100e of the UAV 100 or inside the housing 101 of the UAV 100. The battery 195 may also be detachably coupled to the central portion 100e of the UAV 100.

It will readily be appreciated by one of ordinary skill in the art that more or less than the components shown in FIGS. 1A, 1B and 2 may be included in the UAV 100 corresponding to the performance of the UAV 100 (e.g., a gymbal may be added, or the speaker or camera may be removed) or that other various changes may be made to the configuration of the UAV 100.

Figure 3:
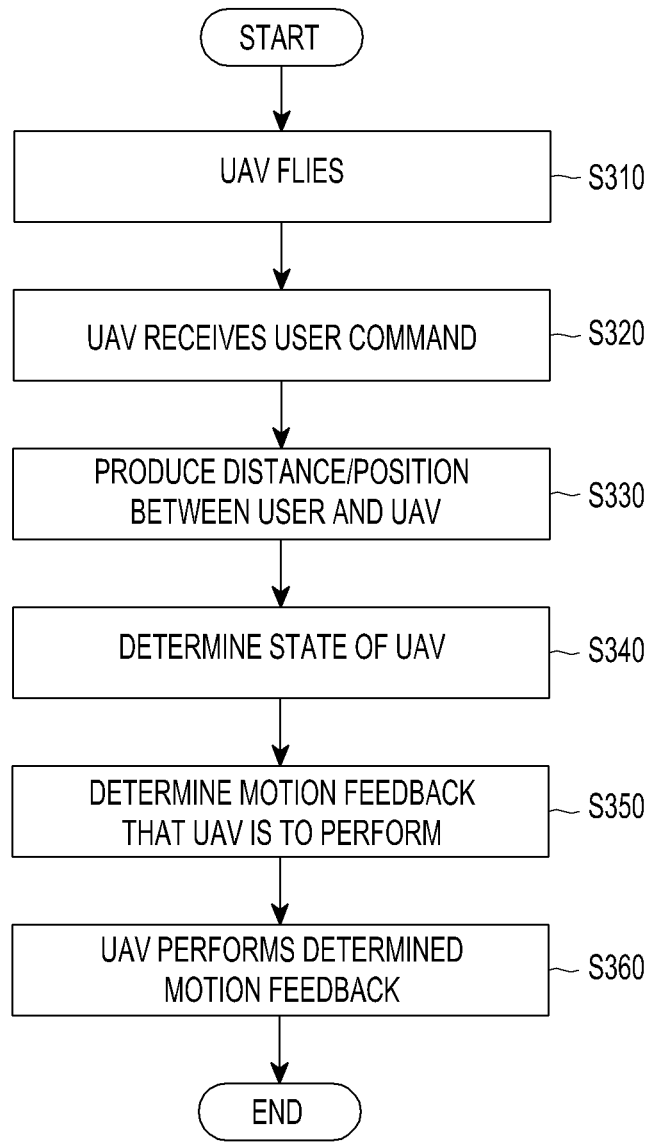
FIG. 3 is a flowchart schematically illustrating a method for controlling the flight of a UAV according to an embodiment of the present disclosure.

FIG. 3 is a flowchart schematically illustrating a method for controlling the flight of a UAV according to an embodiment of the present disclosure.

FIGS. 4A to 4F are views schematically illustrating an example of a method for controlling the flight of a UAV according to an embodiment of the present disclosure.

In operation S310 of FIG. 3, the UAV 100 is in flight.

Figure 4A:
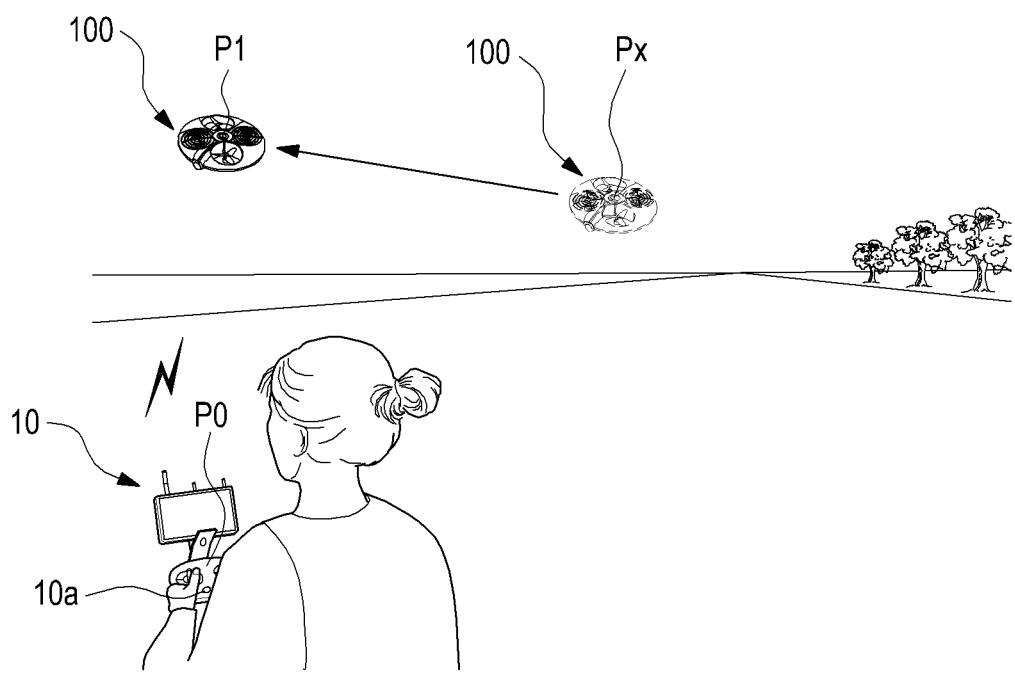
FIGS. 4A, 4B, 4C, 4D, 4E, and 4F are views schematically illustrating an example of a method for controlling the flight of a UAV according to an embodiment of the present disclosure.

Referring to FIG. 4A, the UAV 100 is flying (or move) around the user. The user may perform control to fly (or move) the UAV 100, which is in flight within her view range, from a position Px to another position P1 (which is hereinafter termed "first position") using the remote controller 10.

The UAV 100 may fly (or move) from the position Px to the first position P1 under the control (e.g., auto flight) of the controller 110 of the UAV 100 or under the control (e.g., manual flight) of the remote controller 10. The UAV 100 may hover (or fly) in the first position P1 according to a preset function (e.g., a hovering mode). The UAV 100 may hover (or fly) in the first position P1 according to a preset function (e.g., a manual hovering mode) under the control of the remote controller 10 or a preset function (e.g., an auto hovering mode) under the control of the controller 110 of the UAV 100.

According to an embodiment of the present disclosure, the flight (or movement) of the UAV 100 may mean that the UAV 100 hovers in a 3D space. According to an embodiment of the present disclosure, the flight (or movement) of the UAV 100 may mean that the UAV 100 hovers in a position and altitude within a 3D space.

The UAV 100 may fly (e.g., ascend, descend, move, accelerate, decelerate, or turn) in the first position P1 using the sensor 160 and the driving unit 170. The first position P1 and the position Px may correspond to the 3D space of the flying UAV 100. The first position P1 shown in FIG. 4C (e.g., a two-dimensional (2D) figure) represents in 2D the position of the UAV 100, which is flying in the 3D space.

The controller 110 of the flying UAV 100 may produce the first position P1 using the positioning information receiver 155 and the optical flow sensor 165. The controller 110 of the flying UAV 100 may produce the first position P1 using the positioning information receiver 155, the air pressure sensor 164, and the optical flow sensor 165. The UAV 100 may control the driving unit 170 corresponding to the obtained first position P1, hovering (or flying) in the first position P1.

In operation S320 of FIG. 3, the UAV 100 receives a command from the user.

Figure 4B:
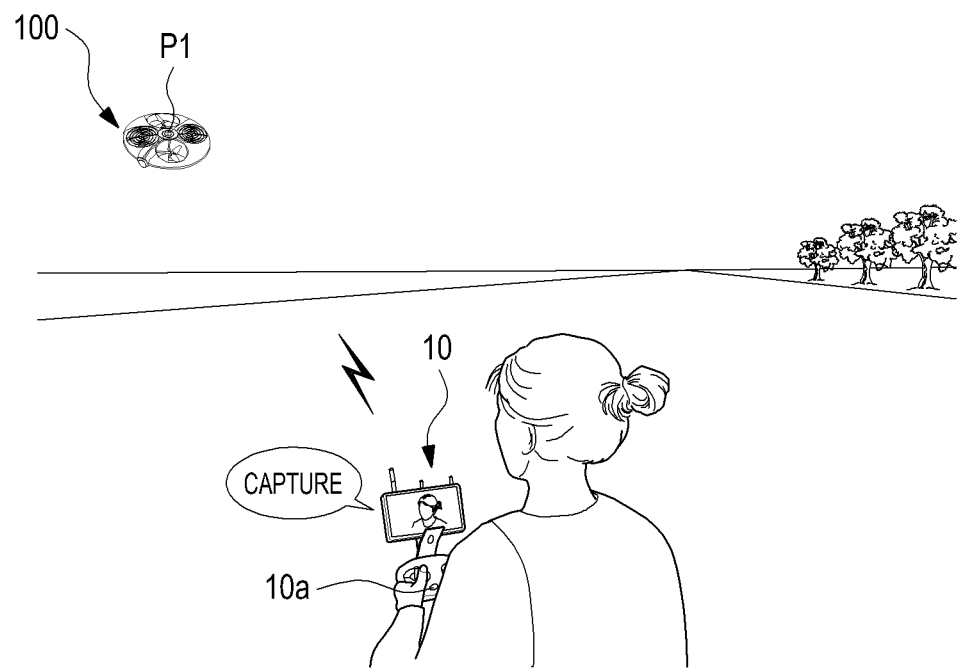

Referring to FIG. 4B, the user may select a capture button 10a (see FIG. 2) of the remote controller 10 corresponding to the capture by the camera 150 of the UAV 100. The capture button 10a may include a button (e.g., a physical button or touch button) or a switch (e.g., a push button switch, slide switch, or toggle switch).

The user may transmit a command (e.g., to capture) to the flying UAV 100 using a communication unit (not shown) of the remote controller 10.

The remote controller 10 may produce the position of the remote controller 10 using a positioning information receiver (not shown). The remote controller 10 may produce a first remote controller position (P0) corresponding to the user's command using the positioning information receiver (not shown).

The remote controller 10 may determine that a remote controller position previously obtained (or stored) for a preset time (e.g., 30 seconds or less, which can be varied) before the user's command is transmitted is the first remote controller position P0). The first remote controller position P0 produced (or determined) by the remote controller 10 may be stored in a storage unit (not shown).

According to the user's command transmitted, the remote controller 10 may transmit first remote controller position information corresponding to the first remote controller position P0 to the UAV 100.

According to the user's command transmitted, the remote controller 10 may receive a transmission request for a first remote controller position information from the UAV 100. According to the received transmission request for the first remote controller position information, the remote controller 10 may transmit the first remote controller position information corresponding to the first remote controller position P0 to the UAV 100.

When the remote controller 10 lacks a positioning information receiver, the UAV 100 may produce a relative position Pr using the received signal strength indication (RSSI) between the remote controller 10 and the UAV 100.

The controller 110 of the UAV 100 which is in flight in the first position P1 may receive the user command from the remote controller 10 using the communication unit 120. The controller 110 of the UAV 100 may store the received user command in the storage unit 185.

The controller 110 of the UAV 100 may analyze the received user command The controller 110 of the UAV 100 may drive the camera 150 to capture an object (e.g., which faces the camera 150) into, e.g., a still image or video, according to the result of the analysis.

According to an embodiment of the present disclosure, the first position P1 may mean a 3D space (or a position in the 3D space) where the UAV 100 receives the user command The second position P2 may mean a 3D space (or a position in the 3D space) where the UAV 100 executes (or starts) motion feedback (refer to FIGS. 5A, 5B, 6A, and 6B). The motion feedback may represent one of a response (e.g., 'Yes' or 'No.' Refer to FIGS. 5A, 5B, 6A, and 6B) corresponding to the user command and the state (e.g., 'error' Refer to FIGS. 5A, 5B, 6A, and 6B) of the UAV 100 through the motion of the UAV 100 according to the user command received from the remote controller 10.

The controller (or the processor) 110 may control the driving unit 170 to move the UAV 100 according to the motion feedback, corresponding to one of an emoticon and text including a letter, the ascent, descent, rotation, flip, inclined ascent, and inclined descent. The controller (or the processor 110) may control the driving unit 170 to continuously perform motion feedbacks (e.g., 'Yes' & 'Start of mission.' Possible to combine those shown in FIGS. 5A, 5B, 6A, and 6B) as well as a single motion feedback (e.g., 'Yes').

The second position P2 may mean a 3D space (or a position in the 3D space) where the determined motion feedback of the UAV 100 is provided to the user (or is started). According to an embodiment of the present disclosure, the first position P1 where the UAV 100 receives the user command and the second position P2 where the UAV 100 executes the motion feedback corresponding to the received user command may be the same or different from each other.

The position (e.g., the position P1) of the UAV 100, where the user command is received, may be changed (to, e.g., a first-first position P1-1) by the flight state and/or ambient environment (e.g., a wind or obstacle) of the UAV 100.

The difference between the first position P1 and the first-first position P1-1 may be smaller than the size (e.g., length X width X height) of the UAV 100. The difference between the first position P1 and the first-first position P1-1 may be 80 cm or less. The difference between the first position P1 and the first-first position P1-1 may be 150 cm or less.

When the first position P1 is varied, the controller 110 of the UAV 100 may execute the motion feedback corresponding to the received user command in the second position P2.

The first position P1 of the UAV 100, where the user command is received may be denoted as a first reference position (or a first reference space). The first reference position P1 may be varied depending on the altitude, direction, and the distance between the user and the UAV 100.

The second position P2 may mean a 3D space that extends from the center of gravity of the UAV 100 to perform motion feedback.

In operation S330 of FIG. 3, the position and/or distance between the user and the UAV 100 is produced.

Figure 4C:
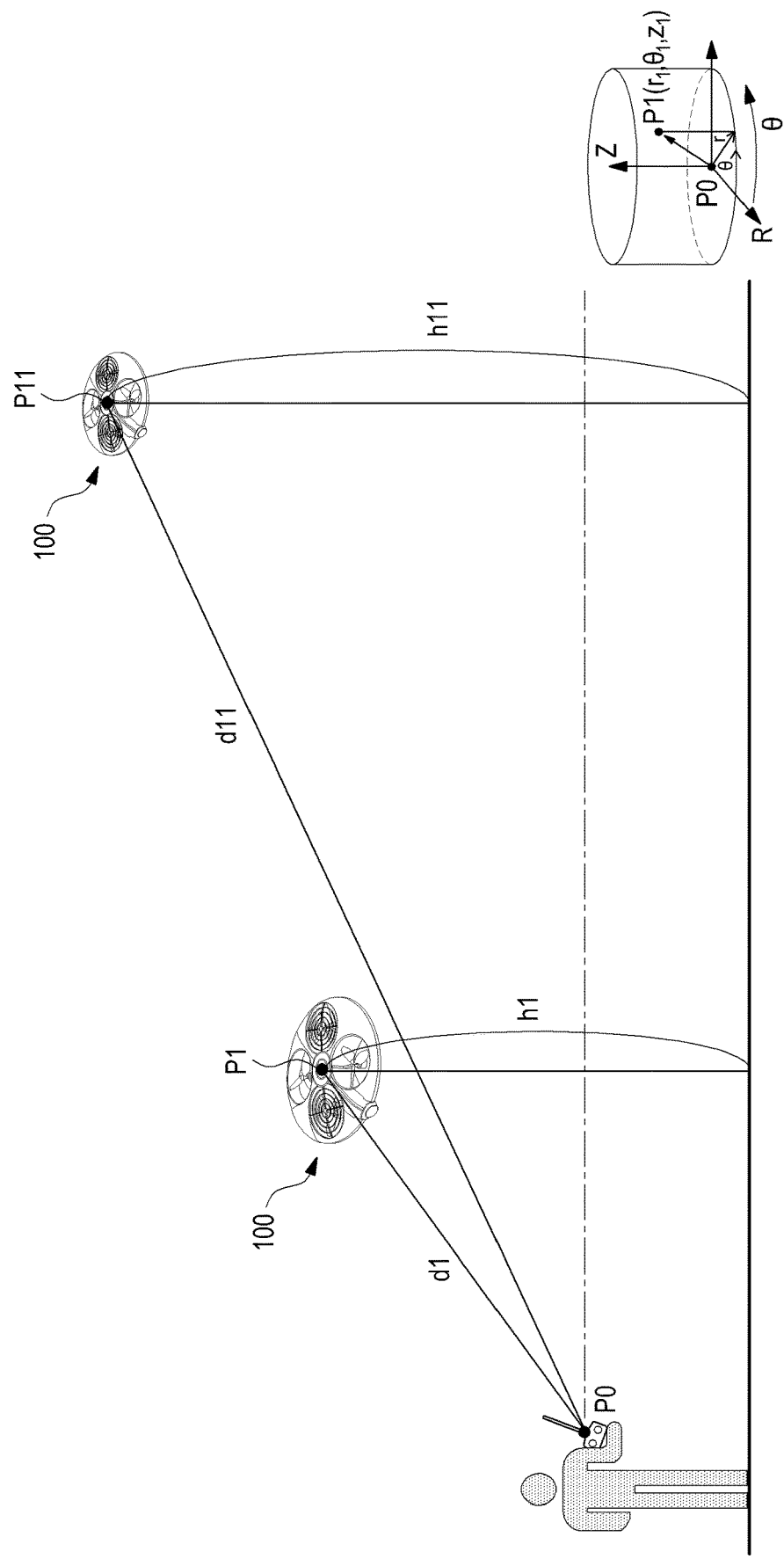

Referring to FIG. 4C, the controller 110 of the UAV 100 may produce the direction and distance between the user and the UAV 100 corresponding to a received user command Corresponding to the user command received, the controller 110 of the UAV 100 may produce the current position Py using the positioning information receiver 155 and the optical flow sensor 165. The current position Py may be a short distance P1 (e.g., 10 m or less from the user) and a long distance P11 (e.g., 10 m or more from the user, which may be varied depending on the size and performance of the UAV 100). The current position Py may be an absolute position.

Corresponding to the user command received, the controller 110 of the UAV 100 may produce the current position Py using the positioning information receiver 155, the air pressure sensor 164, and the optical flow sensor 165. Corresponding to the user command received, the UAV 100 may control the driving unit 170 to correspond to the produced current position Py, enabling the UAV 100 to hover (or fly) in the current position.

The controller 110 of the UAV 100 may store UAV current position information corresponding to the produced current position Py in the storage unit 185. The UAV current position information corresponding to the current position Py may be an absolute position.

The produced current position Py may be the same or different from the first position P1.

Corresponding to the user command received, the controller 110 of the UAV 100 may produce a relative position Pr between the user (or the remote controller 10) and the UAV 100.

Corresponding to the user command received, the controller 110 of the remote controller 10 may receive first remote controller position information corresponding to the first panoramic capture position P0 from the remote controller 10.

The controller 110 of the UAV 100 may produce the relative position Pr between the user (or the remote controller 10) and the UAV 100 using the UAV current position information and the first remote controller position information received. The controller 110 of the UAV 100 may produce the relative position Pr between the user (or the remote controller 10) and the UAV 100 using the UAV current position information, which is an absolute position, and the first remote controller position information, which is an absolute position.

When the remote controller 10 lacks a positioning information receiver, the UAV 100 may produce a relative position Pr using the received signal strength indication (RSSI) between the remote controller 10 and the UAV 100. The relative position Pr between the user (or the remote controller 10) and the UAV 100 may be produced as coordinates in the Cartesian coordinate system (or rectangular coordinate system) or cylindrical coordinate system.

The controller 110 of the UAV 100 may determine the direction (e.g., whether the user may recognize motion feedback in that direction) between the remote controller 10 and the UAV 100 using the camera 150.

The controller 110 of the UAV 100 may recognize the user's face using the camera 150. The controller 110 of the UAV 100 may determine the direction (and/or distance) between the user (or the remote controller 10) and the UAV 100 using the user's face recognized.

The controller 110 of the UAV 100 may determine the direction (e.g., whether the user may take a selfie in that direction) between the remote controller 10 and the UAV 100 using the camera 150 and the optical flow sensor 165. According to an embodiment of the present disclosure, the direction between the remote controller 10 and the UAV 100 may mean a direction in which the motion feedback of the UAV 100 may be recognized by the user.

The direction between the remote controller 10 and the UAV 100 may include, e.g., a 360-degree circle flight direction along which 360-degree image capture is performed around the user, a follow-me direction along which image capture is performed following the user, or a smart selfie direction along which the user's selfie is taken indoors or outdoors. For example, when the UAV 100 receives a user command while performing a follow-me, the controller 110 of the UAV 100 may move the UAV 100 to provide a motion feedback recognizable.

The controller 110 of the UAV 100 may determine each of a first relative position Pr1 between the remote controller 10 and the UAV 100, a first position P1 including a first height h1 of the UAV 100, and/or a first direction and/or distance between the remote controller 10 and the UAV 100 (e.g., d1, d11). The first relative position Pr 1 between the remote controller 10 and the UAV 100, the first position P1 including the first height h1 of the UAV 100, and/or the first direction between the remote controller 10 and the UAV 100 may be denoted first UAV position information.

The controller 110 of the UAV 100 may store, in the storage unit 185, each of the first relative position Pr1 between the remote controller 10 and the UAV 100, the first position P1 including the first height h1 of the UAV 100, and/or the first direction between the remote controller 10 and the UAV 100. The controller 110 of the UAV 100 may store the first UAV position information in the storage unit 185.

The controller 110 of the UAV 100 may determine each of a first-first relative position Pr11 between the remote controller 10 and the UAV 100, a first-first position P11 including a first-first height h1 of the UAV 100, and/or a first-first direction between the remote controller 10 and the UAV 100. The first-first relative position Pr11 between the remote controller 10 and the UAV 100, the first-first position P11 including the first-first height h11 of the UAV 100, and/or the first-first direction between the remote controller 10 and the UAV 100 may be denoted first-first UAV position information.

The controller 110 of the UAV 100 may store, in the storage unit 185, each of the first-first relative position Pr11 between the remote controller 10 and the UAV 100, the first-first position P11 including the first-first height h11 of the UAV 100, and/or the first-first direction between the remote controller 10 and the UAV 100. The controller 110 of the UAV 100 may store the first-first UAV position information in the storage unit 185.

In operation S340 of FIG. 3, the state of the UAV 100 is determined.

Referring to FIG. 4C, the controller 110 of the UAV 100 may determine the state of the UAV 100 corresponding to a user command received. The state of the UAV 100 may include, e.g., a flight state or a system state.

The flight state of the UAV 100 may include a rotational state and a translational state. The flight state of the UAV 100 may include a normal rotational state and a normal translational state. The flight state of the UAV 100 may include an abnormal rotational state and an abnormal translational state.

The system state of the UAV 100 may include, e.g., a normal state, a low-battery state, an internal error state, a communication error state, a memory shortage state, or a motor error state. The above-enumerated examples of the system state of the UAV 100 are merely an example, and the system state of the UAV 100 is not limited thereto. Rather, the system state of the UAV 100 may also include any state that may arise in the UAV 100.

The flight state of the UAV 100 and the system state of the UAV 100 may be termed UAV state information. Corresponding to the relative positions Pr1 and Pr11, they may be denoted first UAV state information and first-first UAV state information.

The controller 110 of the UAV 100 may store the state of the UAV 100, as the UAV state information (e.g., the first UAV state information or the first-first UAV state information), in the storage unit 185.

In operation S350 of FIG. 3, a motion feedback to be performed in the UAV 100 is determined.

Figure 5A:
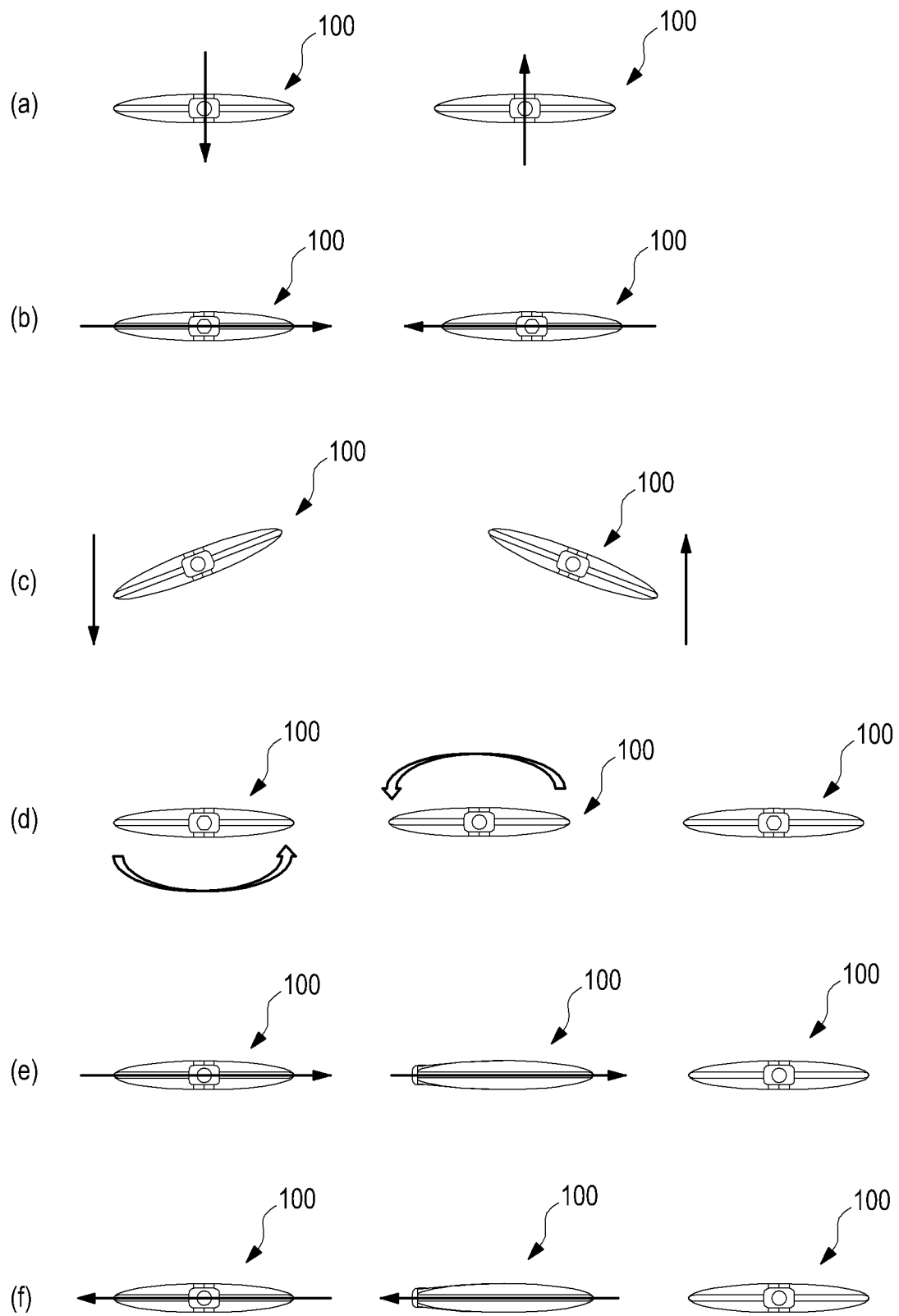
FIGS. 5A and 5B are views schematically illustrating an example of motion feedback of a UAV according to an embodiment of the present disclosure.
Figure 5B:
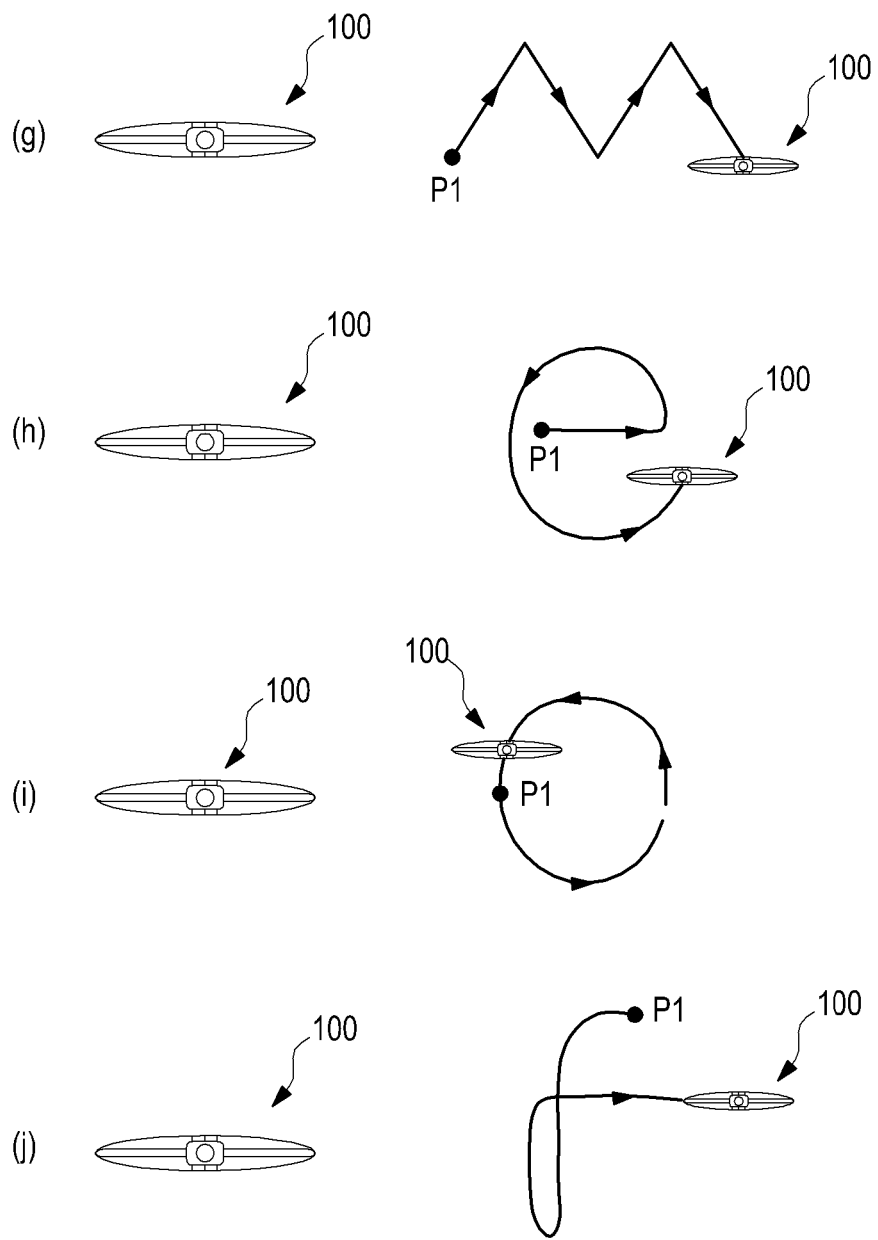

Referring to FIGS. 4C, 5A, and 5B, the controller 110 of the UAV 100 may determine a motion feedback (refer to FIGS. 5A and 5b) corresponding to a user command. The controller 110 of the UAV 100 may determine one of a plurality of motion feedbacks (refer to FIGS. 5A and 5b) stored in the storage unit 185. The controller 110 of the UAV 100 may determine a motion feedback (FIG. 5A(a)) corresponding to a user command (e.g., an image capture command)

The motion feedbacks (refer to FIGS. 5A and 5B) may be stored as motion feedback information in the storage unit 185. The motion feedbacks (refer to FIGS. 5A and 5B) each may be stored as a separate piece of motion feedback information in the storage unit 185. FIG. 5A illustrates an example of a response to the user command of the UAV 100. FIG. 5B illustrates an example of a state (e.g., an error) of the UAV 100.

The controller 110 of the UAV 100 may determine the motion feedback corresponding to the determined first UAV position information and/or first UAV state information. The controller 110 of the UAV 100 may determine the motion feedback corresponding to the determined first-first UAV position information and/or first-first UAV state information.

The controller 110 of the UAV 100 may determine the magnitude M of the motion feedback using the determined first UAV position information and/or first UAV state information. The controller 110 of the UAV 100 may determine the magnitude M of the motion feedback using the determined first-first UAV position information and/or first-first UAV state information.

The magnitude of the motion feedback may mean a horizontally traveling distance (width) and a vertically traveling distance (height) of the determined motion feedback. The magnitude of the motion feedback may mean a horizontally traveling distance (width) in 3D and the vertically traveling distance (height) in 3D of the determined motion feedback. In the magnitude of the motion feedback, at least one of the horizontally traveling distance (width) and the vertically traveling distance (height) may be varied.

The magnitude of the motion feedback may be varied corresponding to the UAV position information between the user (or the remote controller 10) and the UAV 100. For example, the magnitude of the motion feedback may be varied depending on the relative position (e.g., Pr1 or Pr11) between the user (or the remote controller 10) and the UAV 100. The magnitude of the motion feedback may be varied depending on the height (e.g., h1 or h11) of the UAV 100. The magnitude of the motion feedback may be varied depending on the direction (e.g., the first direction or first-first direction) between the user (or the remote controller 10) and the UAV 100.

The magnitude M of the motion feedback may be stored as motion feedback information in the storage unit 185.

The controller 110 of the UAV 100 may control the driving unit 170 according to the motion feedback (refer to FIG. 5A) to ascend, descend, rotate, flip, inclinedly ascend, or inclinedly descend the UAV 100 (refer to parts (a)-(f) of FIG. 5A). The controller 110 of the UAV 100 may control the driving unit 170 according to the motion feedback (refer to FIG. 5B) to move the UAV 100 along the text including a letter (FIG. 5B(h) to (j)) or emoticon (FIG. 5B(g)).

Referring to FIG. 5A(a), the motion feedback information may include each item of the title ('yes') of the motion feedback, a motion feedback gesture (e.g., the ascend or descend of the UAV 100 corresponding to the user nodding), the horizontally traveling distance of motion feedback (e.g., 0.5 m which may be varied), the vertically traveling distance of motion feedback (e.g., 1.5 m which may be varied), the traveling speed of motion feedback (e.g., 25% of the maximum speed of the UAV which is variable), or whether there is an additional feedback (e.g., LED flickering or alert sound). The start direction of the motion feedback gesture may be varied (e.g., so that the ascend is first performed).

Referring to FIG. 5A(b), the motion feedback information may include each item of the title ('no') of the motion feedback, a motion feedback gesture (e.g., the left movement (or left turn) and right movement (or right turn) of the UAV 100 corresponding to the user turning her head to the left or right), the horizontally traveling distance of motion feedback (e.g., 1.0 m which may be varied), the vertically traveling distance of motion feedback (e.g., 0.5 m which may be varied), the traveling speed of motion feedback (e.g., 30% of the maximum speed of the UAV which is variable), or whether there is an additional feedback (e.g., LED flickering or alert sound). The start direction of the motion feedback gesture may be varied (e.g., so that the right movement is first performed).

Referring to FIG. 5A(c), the motion feedback information may include each item of the title ('I don't know') of the motion feedback, a motion feedback gesture (e.g., the descend of the UAV 100, with its left side tilted, and the ascend of the UAV 100, with its right side tilted, corresponding to the user tilting her head), the horizontally traveling distance of motion feedback (e.g., 0.5 m which may be varied), the vertically traveling distance of motion feedback (e.g., 1.5 m which may be varied), the traveling speed of motion feedback (e.g., 35% of the maximum speed of the UAV which is variable), or whether there is an additional feedback (e.g., LED flickering or alert sound). The start direction of the motion feedback gesture may be varied (e.g., so that the UAV 100 is first descended with its right side tilted).

Referring to FIG. 5A(d), the motion feedback information may include each item of the title ('Oh, yes') of the motion feedback, a motion feedback gesture (e.g., a 360-degree forward flip of the UAV 100), the horizontally traveling distance of motion feedback (e.g., 0.5 m which may be varied), the vertically traveling distance of motion feedback (e.g., 1.0 m which may be varied), the traveling speed of motion feedback (e.g., 25% of the maximum speed of the UAV which is variable), or whether there is an additional feedback (e.g., LED flickering or alert sound). The start direction of the motion feedback gesture may be varied (e.g., so that the UAV 100 is 360-degree flipped over backwards).

Referring to FIG. 5A(e), the motion feedback information may include each item of the title ('Start of mission') of the motion feedback, a motion feedback gesture (e.g., one full turn to the left of the UAV 100), the horizontally traveling distance of motion feedback (e.g., 1.0 m which may be varied), the vertically traveling distance of motion feedback (e.g., 0.5 m which may be varied), the traveling speed of motion feedback (e.g., 20% of the maximum speed of the UAV which is variable), or whether there is an additional feedback (e.g., LED flickering or alert sound). The start direction of the motion feedback gesture may be varied (e.g., so that the UAV 100 makes one full turn to the right).

Referring to FIG. 5A(f), the motion feedback information may include each item of the title ('End of mission') of the motion feedback, a motion feedback gesture (e.g., one full turn to the right of the UAV 100), the horizontally traveling distance of motion feedback (e.g., 1.0 m which may be varied), the vertically traveling distance of motion feedback (e.g., 0.5 m which may be varied), the traveling speed of motion feedback (e.g., 20% of the maximum speed of the UAV which is variable), or whether there is an additional feedback (e.g., LED flickering or alert sound). The start direction of the motion feedback gesture may be varied (e.g., so that the UAV 100 makes one full turn to the left).

Referring to FIG. 5B(g), the motion feedback information may include each item of the title ('Let user smile') of the motion feedback, a motion feedback gesture (e.g., a ↗ ↗ ↘ ↘ movement to the left of the UAV 100), the horizontally traveling distance of motion feedback (e.g., 2.0 m which may be varied), the vertically traveling distance of motion feedback (e.g., 1.5 m which may be varied), the traveling speed of motion feedback (e.g., 25% of the maximum speed of the UAV which is variable), or whether there is an additional feedback (e.g., LED flickering or alert sound). The start direction of the motion feedback gesture may be varied (e.g., so that the UAV 100 makes ↗ ↗ ↘ ↘ movement to the right).

Referring to FIG. 5B(h), the motion feedback information may include each item of the title ('Error(internal)') of the motion feedback, a motion feedback gesture (e.g., an 'e'-shaped movement to the left of the UAV 100), the horizontally traveling distance of motion feedback (e.g., 1.5 m which may be varied), the vertically traveling distance of motion feedback (e.g., 2.5 m which may be varied), the traveling speed of motion feedback (e.g., 45% of the maximum speed of the UAV which is variable), or whether there is an additional feedback (e.g., LED flickering or alert sound).

Referring to FIG. 5B(i), the motion feedback information may include each item of the title ('Obstacle') of the motion feedback, a motion feedback gesture (e.g., an 'O'-shaped movement to the left of the UAV 100), the horizontally traveling distance of motion feedback (e.g., 1.5 m which may be varied), the vertically traveling distance of motion feedback (e.g., 1.5 m which may be varied), the traveling speed of motion feedback (e.g., 25% of the maximum speed of the UAV which is variable), or whether there is an additional feedback (e.g., LED flickering or alert sound).

Referring to FIG. 5B(j), the motion feedback information may include each item of the title ('Far') of the motion feedback, a motion feedback gesture (e.g., an 'f'-shaped movement to the left of the UAV 100), the horizontally traveling distance of motion feedback (e.g., 1.0 m which may be varied), the vertically traveling distance of motion feedback (e.g., 2.5 m which may be varied), the traveling speed of motion feedback (e.g., 35% of the maximum speed of the UAV which is variable), or whether there is an additional feedback (e.g., LED flickering or alert sound).

The above-described items of the motion feedback information are merely an example, and embodiments of the present disclosure are not limited thereto. The items of the motion feedback information may be varied corresponding to the performance and structure of the UAV 100.

The controller 110 of the UAV 100 may store the determined feedback one of those shown in FIGS. 5A(a) to FIG. 5B(i)) and motion feedback magnitude, as motion feedback determination information, in the storage unit 185.

In operation S360 of FIG. 3, the motion feedback determined by the UAV 100 is performed.

Figure 4D:
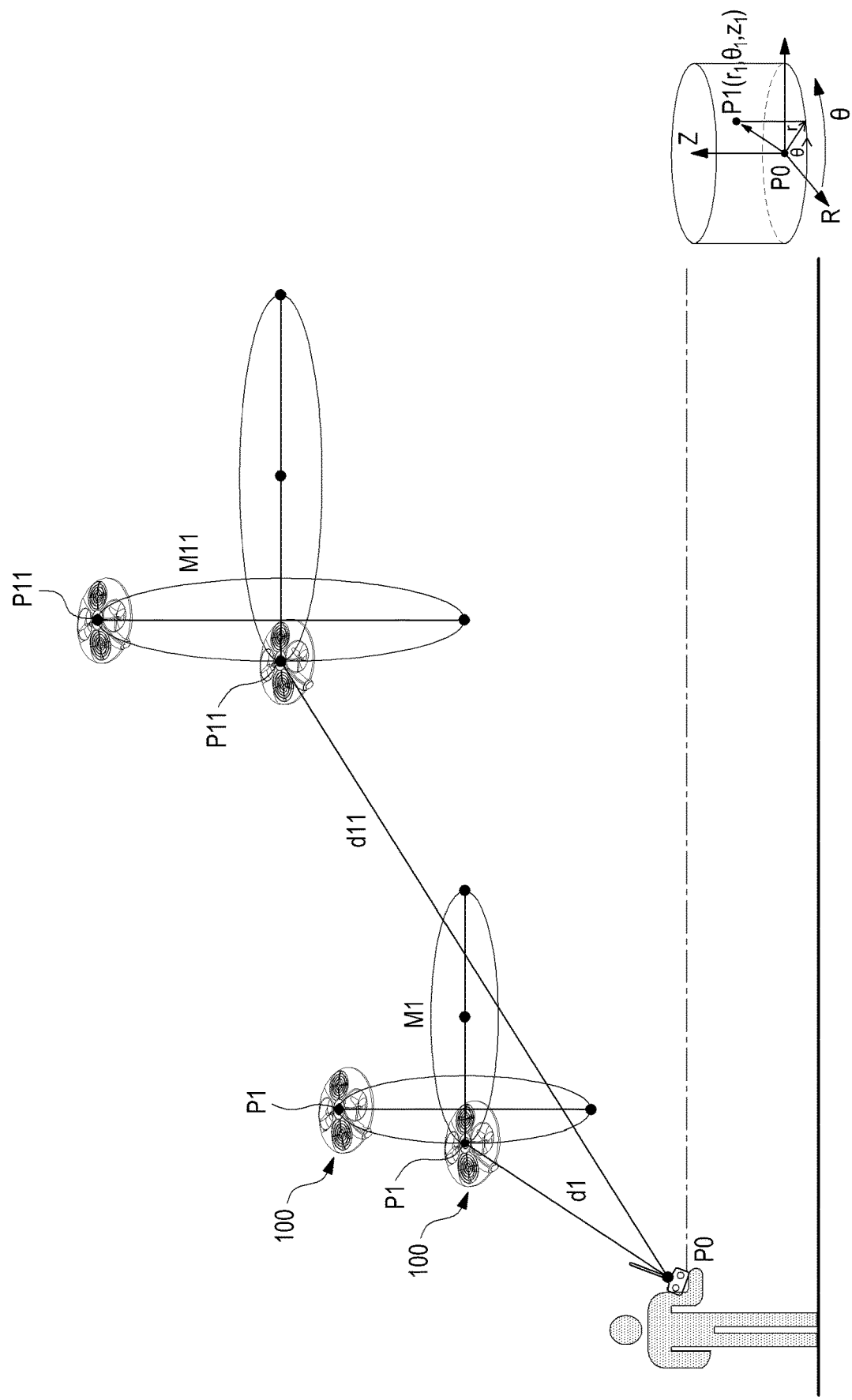

Referring to FIGS. 4D, 5A, and 5B, the controller 110 of the UAV 100 may control the driving unit 170 to perform the motion feedback corresponding to the user command. Upon receiving the user command, the controller 110 of the UAV 100 may control the driving unit 170 to start the motion feedback corresponding to the user command within a preset time (e.g., 2 seconds, which is variable).

The controller 110 of the UAV 100 may control the driving unit 170 to perform the motion feedback according to the motion feedback determination information stored in the storage unit 185. The UAV 100 may perform the motion feedback (e.g., FIG. 5A(a)) determined to have the motion feedback magnitude M (e.g., M1, M11) which is determined according to the motion feedback determination information stored in the storage unit 185. The UAV 100 may perform additional feedback (e.g., LED flickering or alert sound) while performing the motion feedback (e.g., FIG. 5A(a)) determined to have the motion feedback magnitude M which is determined according to the motion feedback determination information stored in the storage unit 185.

The controller 110 of the UAV 100 may transmit a response or notification corresponding to the motion feedback performed by the UAV 100 through the communication unit 120 to the remote controller 10.

Upon receipt of the response (or notification) corresponding to the motion feedback performed, the remote controller 10 may provide the user with a vibration according to a stored vibration pattern (or haptic pattern) using an embedded vibration motor (not shown). Different vibrations (or vibration patterns) as provided to the user may be outputted depending on the motion feedbacks (refer to FIGS. 5A, 5B, 6A, and 6B) performed by the UAV 100. The user may be aware whether motion feedback is performed by the UAV 100 through the vibration of the remote controller 10.

According to an embodiment of the present disclosure, the user may transmit a user command (e.g., to take a selfie) to the UAV 100, which is flying out of her view range (e.g., behind the user) (e.g., follow-me), using the remote controller 10.

Figure 4E:
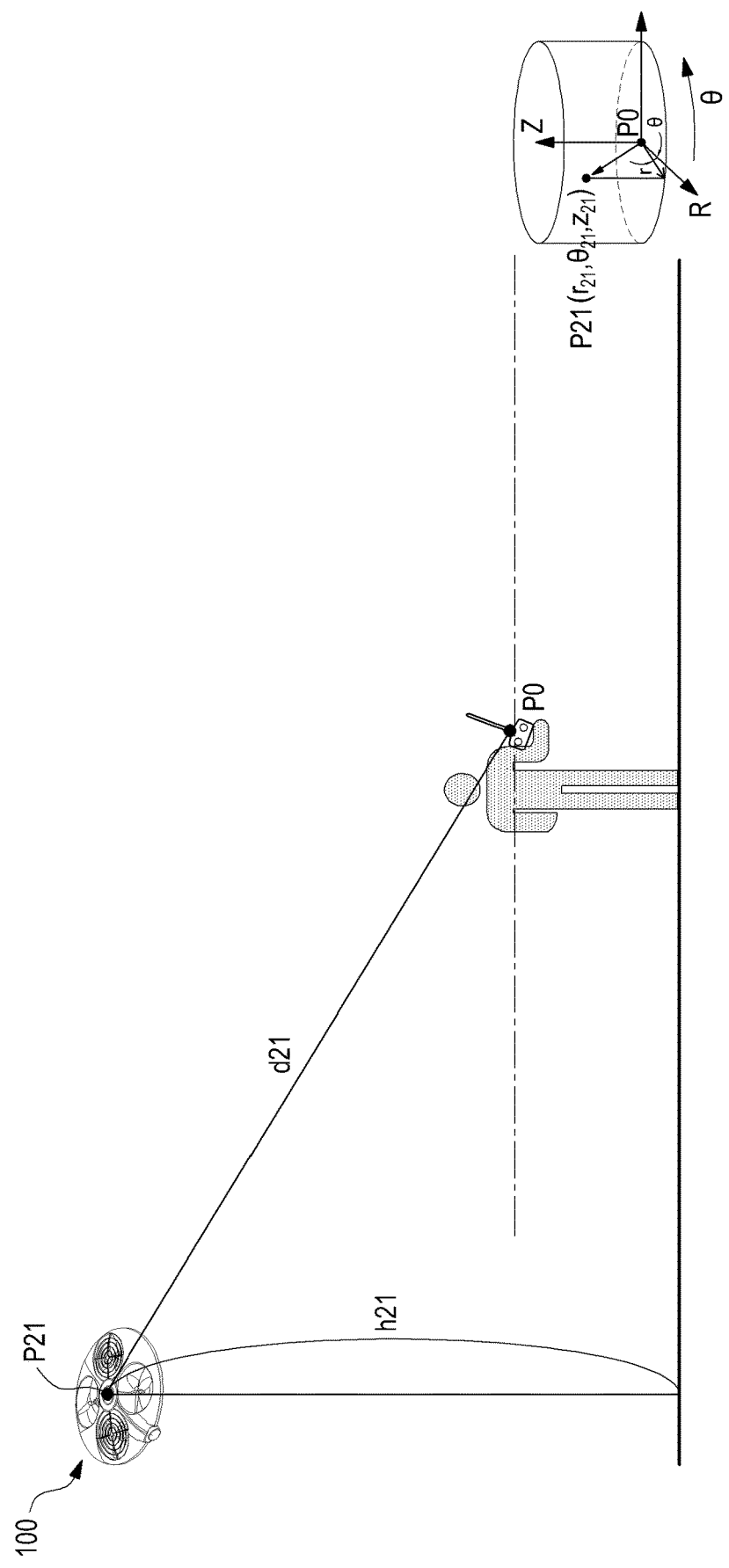
Figure 4F:
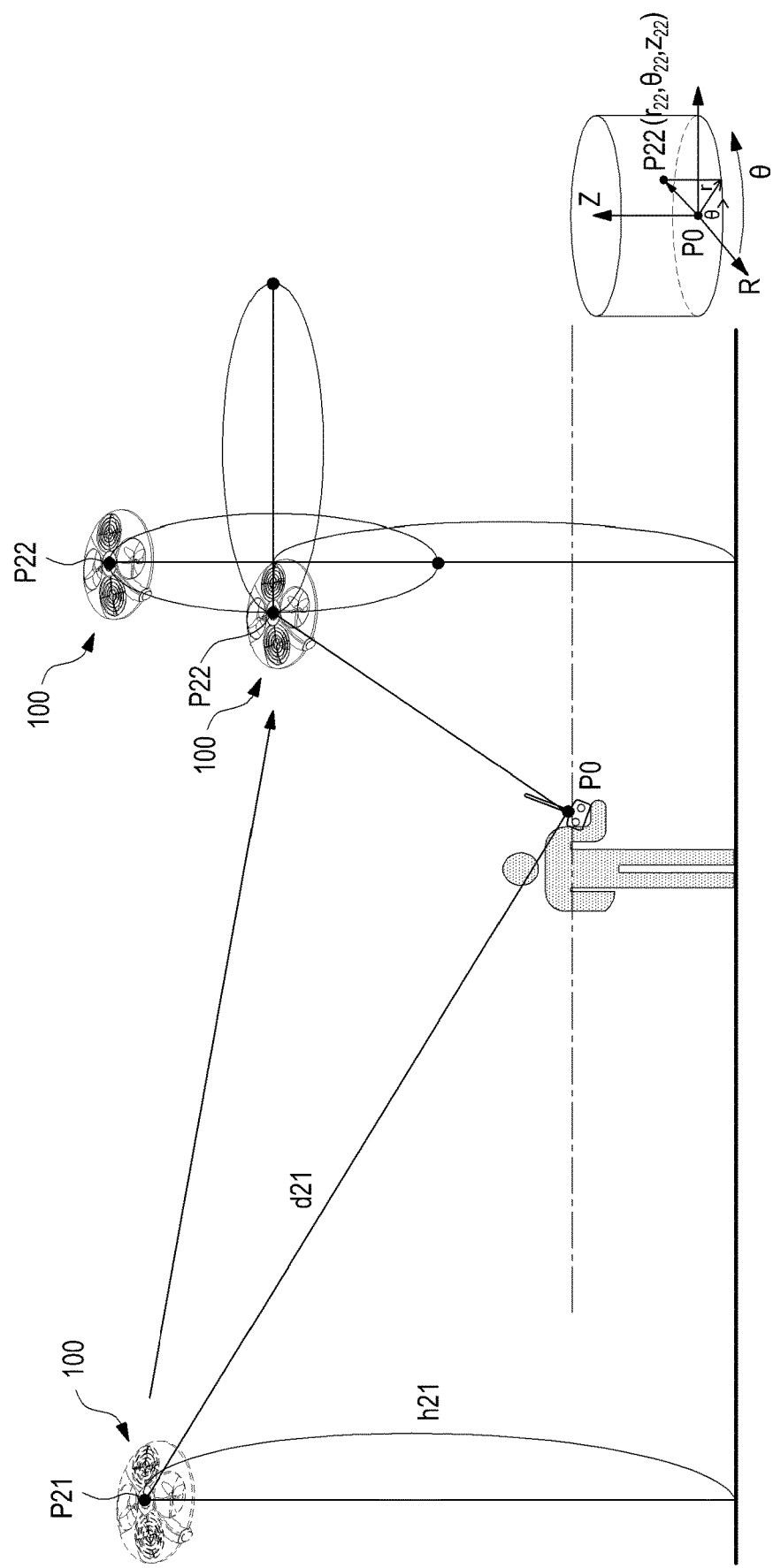

Referring to FIGS. 4E and 4F, corresponding to the user command received, the controller 110 of the UAV 100 may produce the current position P21 using the positioning information receiver 155 and the optical flow sensor 165.

Producing the position of the UAV 100 which is flying behind the user is substantially similar to producing the current position Py of the UAV 100 which is flying within the user's view range in operation S330 of FIG. 3, and no further description thereof is repeated.

Corresponding to the user command received, the controller 110 of the UAV 100 may produce a relative position (e.g., a second relative position Pr21) between the user (or the remote controller 10) and the UAV 100.

Producing the relative position (Pr21) of the UAV 100 which is flying behind the user is substantially similar to producing the relative position Pr of the UAV 100 which is flying within the user's view range in operation S330 of FIG. 3, and no further description thereof is repeated.

The controller 110 of the UAV 100 may determine the direction (e.g., whether the user may recognize motion feedback in that direction) between the remote controller 10 and the UAV 100 using the camera 150.

Recognizing the user's face by the UAV 100 which is flying behind the user is substantially similar to recognizing the user's face by the UAV 100 which is flying within the user's view range in operation S330 of FIG. 3, and no further description thereof is repeated.

The controller 110 of the UAV 100 may determine each of a second-first relative position Pr21 between the remote controller 10 and the UAV 100, a second-first position P21 including a second-first height h21 of the UAV 100, and/or a second-first direction between the remote controller 10 and the UAV 100.

The second-first relative position Pr21 between the remote controller 10 and the UAV 100, the second-first position P21 including the second-first height h21 of the UAV 100, and/or the second-first direction between the remote controller 10 and the UAV 100 may be denoted second-first UAV position information. The controller 110 of the UAV 100 may store the second-first UAV position information in the storage unit 185.

The controller 110 of the UAV 100 may determine the state of the UAV 100 corresponding to a user command received.

Determining the state of the UAV 100 which is flying behind the user is substantially similar to determining the state of the UAV 100 which is flying within the user's view range in operation S340 of FIG. 3, and no further description thereof is repeated.

The controller 110 of the UAV 100 may store the determined state of the UAV 100, as second-first UAV state information, in the storage unit 185.

The controller 110 of the UAV 100 may control the UAV 100 to move to a second-second position within the user's view range (e.g., in front of the user) corresponding to the determined second-first direction (behind the user). The controller 110 of the UAV 100 may control the driving unit 170 of the UAV 100 using a known algorithm corresponding to the movement of the UAV 100 to the second-second position within the user's view range (e.g., in front of the user) corresponding to the determined second-first direction (behind the user).

The controller 110 of the UAV 100 may control the UAV 100 to move to the second-second position at a preset speed (e.g., 80% to 100% of the maximum speed, which is variable) for the UAV 100 corresponding to the determined second-first direction (behind the user).

The second-second position P22 may be a position preset (or pre-stored) given the user's position. For example, the second position P22 may be a position that is 45 degrees up in front of the user, is 3 m (or 1 m or more to 8 m or less, which is variable) away from the first remote controller position P0, and is at a second-second height (which is larger than 3 m).

The second-second position P22 may be an opposite position of the second-first position P21 with respect to the user's position (or the first remote controller position P0). The second-second position P22 may be an opposite position of the second-first position P21 within the user's view range with respect to the user's position (or the first remote controller position P0). The second-second position P22 may be an opposite position (e.g., which is within the user's view range) of a circle having, as its radius, the distance d21 between the user's position P0 and the second-first position P21, with respect to the user's position (or the first remote controller position P0).

The second-second position P22 may be an opposite position (e.g., which is within the user's motion feedback recognizable view range) of the second-first position P21 which is on the circle having, as its radius, the distance d21 between the user's position P0 and the second-first position P21, with respect to the user's position (or the first remote controller position P0).

The controller 110 of the UAV 100 may determine a motion feedback (e.g., FIG. 5A(a)) at least one time of before heading for the second-second position, while moving to the second-second position, and when reaching the second-second position.

The controller 110 of the UAV 100 may store the determined feedback (e.g., FIG. 5A(a)) and motion feedback magnitude M, as motion feedback determination information, in the storage unit 185.

The controller 110 of the UAV 100 which is flying in the second-second position may perform the motion feedback corresponding to the user command. The controller 110 of the UAV 100 may start the motion feedback corresponding to the user command within a preset time (e.g., 2 seconds or less which is variable).

Performing the motion feedback by the UAV 100 flying in the second-second position is similar to performing motion feedback by the UAV 100 in operation S360 of FIG. 3, and no repetitive description is given.

According to an embodiment of the present disclosure, upon failing to receive a user command for a preset time (e.g., 10 seconds or more which is variable), the controller 110 of the UAV 100 may automatically perform a motion feedback.

Figure 6A:
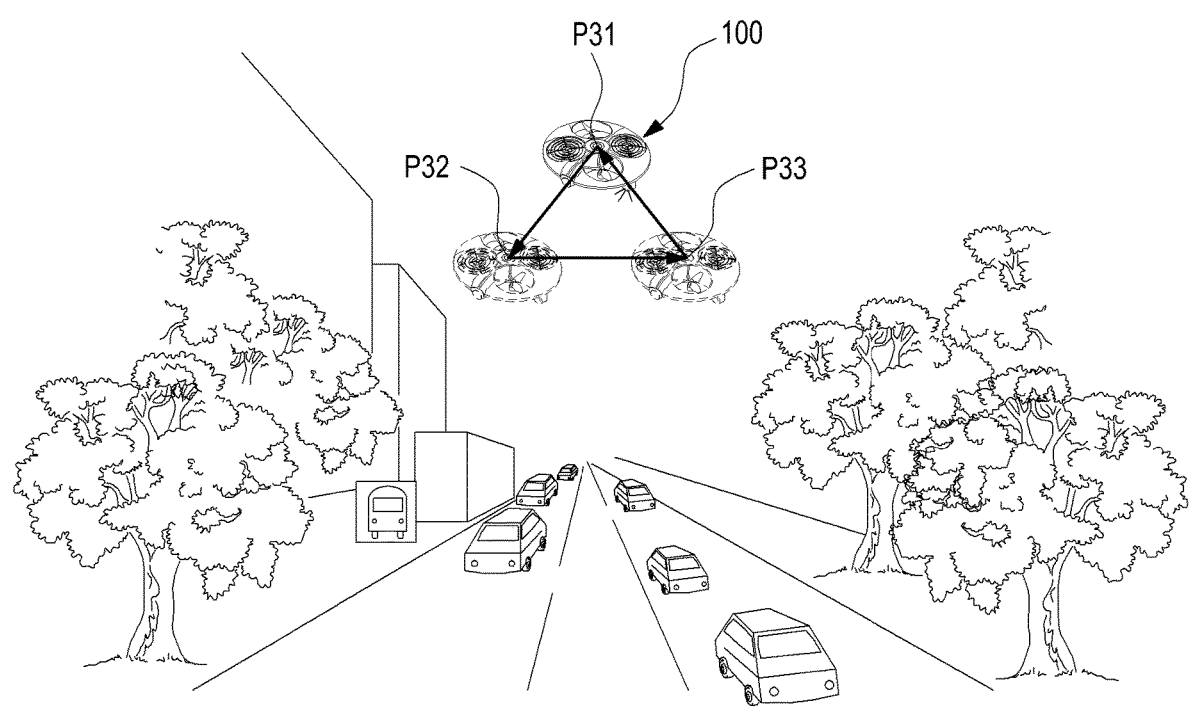
FIGS. 6A and 6B are views schematically illustrating an example of a method for controlling the flight of a UAV according to an embodiment of the present disclosure.

Referring to FIG. 6A, when the UAV 100 performs a follow-me, the controller 110 of the UAV 100 may capture an emergency around the user using the camera 150.

Upon determining that the user encounters an emergency, the UAV 100 may perform a motion feedback corresponding to such emergency. The motion feedback corresponding to the emergency may be stored, as motion feedback information, in the storage unit 185.

The motion feedback information may include each item of the title ('emergency') of the motion feedback, a motion feedback gesture (e.g., a triangular movement to the left of the UAV 100, such as a movement among positions P31, P32 and P33), the horizontally traveling distance of motion feedback (e.g., 2.0 m which may be varied), the vertically traveling distance of motion feedback (e.g., 2.0 m which may be varied), the traveling speed of motion feedback (e.g., 50% of the maximum speed of the UAV which is variable), or whether there is an additional feedback (e.g., LED flickering or alert sound). The start direction of the motion feedback gesture may be varied (e.g., so that the right movement is first performed).

The controller 110 of the UAV 100 may start the motion feedback corresponding to the emergency within a preset time (e.g., 2 seconds or less which is variable). The controller 110 of the UAV 100 may perform the motion feedback according to the motion feedback information corresponding to emergency which is stored in the storage unit 185.

According to an embodiment of the present disclosure, the user may deliver a user command to the UAV 100 using a preset gesture. By recognizing the preset gesture, the UAV 100 may perform the motion feedback.

Figure 6B:
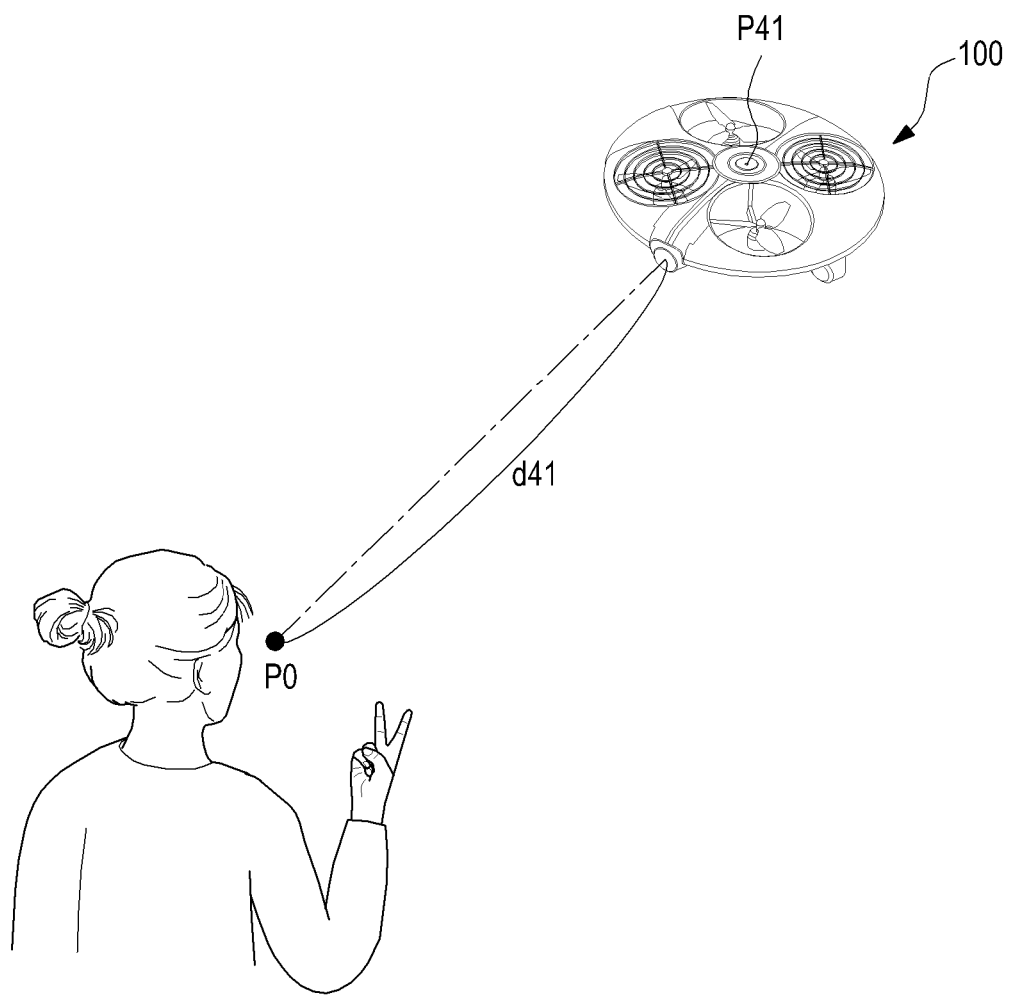

Referring to FIG. 6B, when the UAV 100 performs a smart selfie in a fourth-first position P41 which is away by a fourth-first distance d41, the controller 110 of the UAV 100 may capture the user's gesture (e.g., to make a V with her fingers which is variable) using the camera 150.

When the controller 110 of the UAV 100 recognizes the user's gesture, the UAV 100 may perform the motion feedback (e.g., FIG. 5B(g)) corresponding to the user's gesture. The user's gesture may be the same in meaning as a user command. The motion feedback corresponding to the user's gesture may be stored as motion feedback information in the storage unit 185.

The motion feedback information corresponding to the user's gesture is substantially the same as the motion feedback information described above in connection with FIG. 5B(g), and no repetitive description is presented.

The controller 110 of the UAV 100 may start the motion feedback corresponding to the user's gesture within a preset time (e.g., 2 seconds or less which is variable). The controller 110 of the UAV 100 may perform the motion feedback according to the motion feedback information corresponding to the user's gesture which is stored in the storage unit 185.

In operation S360 of FIG. 3, when the UAV 100 performs the motion feedback, the method for controlling the flight of the UAV is terminated.

The methods according to the embodiments of the present disclosure may be implemented in the form of programming commands executable by various computer means, and the programming commands may be recorded in a computer-readable medium. The computer-readable medium may include programming commands, data files, or data structures, alone or in combinations thereof. The computer-readable medium may be stored in a volatile or non-volatile storage device such as a read-only memory (ROM) or other storage devices, a memory, such as a random-access memory (RAM), a memory chip, a device or an integrated circuit, or a storage medium, such as, e.g., a compact disc (CD), a digital video disc (DVD), a magnetic disk, or a magnetic tape, which allows for optical or magnetic recording while simultaneously read out by a machine (e.g., a computer).

The memory that may be included in the UAV may be an example of a storage medium that may be read out by a machine appropriate to store a program or programs including instructions for realizing the embodiments of the present disclosure. The programming commands recorded in the medium may be specially designed and configured for the present disclosure or may be known and available to one of ordinary skill in the computer software-related art.

As is apparent from the foregoing description, according to the present disclosure, there may be provided a UAV that performs a motion feedback corresponding to a user command received by a flying UAV and a method for controlling the flight of the UAV.

There may be provided a UAV that performs a motion feedback corresponding to a user command received by a flying UAV, within the user's view range, and a method for controlling the flight of the UAV.

There may be provided a UAV that performs the same motion feedback corresponding to a user command received by a flying UAV and varied in magnitude depending on the distance between the user and the UAV, within the user's view range, and a method for controlling the flight of the UAV.

There may be provided a UAV that moves to a position within the user's view range to perform a motion feedback corresponding to a user command received by a flying UAV according to the direction of the UAV and a method for controlling the flight of the UAV.

Embodiments of the present disclosure are not limited thereto. According to various embodiments of the present disclosure, there may be provided a UAV that performs a motion feedback corresponding to a received user command and a method for controlling the flight of the UAV.

As such, it should be appreciated that although the present disclosure has been shown and described in connection with a limited number of embodiments thereof, various changes in form or detail may be made thereto by those skilled in the art.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An unmanned aerial vehicle (UAV) comprising:
   a transceiver;
   a driving unit including an electronic speed controller (ESC), a motor, and a propeller, the driving unit being configured to fly the UAV;
   a positioning information receiver;
   a camera; and
   at least one processor,
   wherein the at least one processor is configured to:
     receive, from a remote controller, a user command through the transceiver,
     based on receiving the user command, obtain positioning information of the UAV using the positioning information receiver,
     recognize a face of a user using an image obtained through the camera,
     calculate, based on a size of the recognized face of the user, a distance between the UAV and the user,
     calculate, based on the recognized face of the user, a direction between the UAV and the user, and
     control the driving unit to perform a motion feedback that represents a response, the response corresponding to the user command and a state of the UAV, the motion feedback comprising motion of the UAV,
   wherein the state of the UAV represents a flight state of the UAV and a system error state of the UAV, the system error state of the UAV including an internal error state, a communication error state, and a motor error state of the UAV, and
   wherein the at least one processor is further configured to control the driving unit to perform the motion feedback in which the UAV moves in a form of an alphabet representing the system error state, based on the UAV being in the system error state.

2. The UAV of claim 1, wherein the positioning information of the UAV comprises a current position of the UAV, a relative position between the remote controller and the UAV, and a direction between the remote controller and the UAV.

3. The UAV of claim 2, wherein, in response to the direction between the remote controller and the UAV being out of a user's view range, the at least one processor is further configured to control the driving unit to move the UAV to a position within the user's view range.

4. The UAV of claim 1, wherein the at least one processor is further configured to:
   determine a magnitude of the motion feedback corresponding to the state of the UAV and the positioning information of the UAV, and
   control the driving unit to perform the motion feedback corresponding to the magnitude of the motion feedback.

5. The UAV of claim 4, wherein the at least one processor is further configured to control the driving unit to perform the motion feedback within a user's view range according to the magnitude of the motion feedback.

6. The UAV of claim 4, wherein the at least one processor is further configured to vary the magnitude of the motion feedback corresponding to a distance between the remote controller and the UAV.

7. The UAV of claim 1,
   wherein the at least one processor is further configured to perform an additional feedback corresponding to performing the motion feedback, and
   wherein the performing of the additional feedback comprises at least one of flickering a light emitting diode (LED) or outputting an alert sound through a speaker of the UAV.

8. The UAV of claim 1, wherein the at least one processor is further configured to:
   determine the motion feedback among a plurality of motion feedbacks stored in a memory of the UAV, based on a distance between the UAV and the remote controller and the state of the UAV, and
   control the driving unit to perform the motion feedback.

9. The UAV of claim 1, wherein the at least one processor is further configured to control the driving unit to at least one of ascend the UAV, descend the UAV, turn the UAV, flip the UAV, ascend the UAV at an incline, descend the UAV at a decline, or move the UAV in a direction corresponding to one of a text including a letter or an emoticon according to a motion feedback.

10. The UAV of claim 1, wherein the at least one processor is further configured to control the camera to receive a user gesture corresponding to the user command.

11. The UAV of claim 1, further comprising:
    at least one camera,
    wherein the at least one processor is further configured to control the at least one camera and the camera to capture a three-dimensional (3D) still image and/or video.

12. The UAV of claim 11, further comprising:
    at least one gimbal configured to stabilize at least one of the at least one camera and the camera.

13. A method for controlling flight of an unmanned aerial vehicle (UAV), the method comprising:
    connecting the UAV to a remote controller through a transceiver of the UAV;
    receiving, from the remote controller, a user command through the transceiver;
    based on receiving the user command, obtaining positioning information of the UAV using a positioning information receiver of the UAV;
    recognizing a face of a user using an image obtained through a camera;
    calculating, based on a size of the recognized face of the user, a distance between the UAV and the user;
    calculating, based on the recognized face of the user, a direction between the UAV and the user; and
    performing a motion feedback that represents a response, the response corresponding to the user command and a state of the UAV, the motion feedback comprising motion of the UAV, wherein the state of the UAV represents a flight state of the UAV and a system error state of the UAV, the system error state of the UAV including an internal error state, a communication error state, and a motor error state of the UAV, and wherein the method further comprises performing the motion feedback in which the UAV moves in a form of an alphabet representing the system error state, based on the UAV being in the system error state.

14. The method of claim 13, further comprising:

determining a magnitude of the motion feedback of the UAV according to the distance between the user and the UAV, wherein, as the distance between the user and the UAV increases, the magnitude of the motion feedback varies.

15. The method of claim 13, further comprising:

determining the motion feedback among a plurality of motion feedbacks stored in a memory of the UAV, based on a distance between the UAV and the remote controller and the state of the UAV; and performing the motion feedback.

16. The method of claim 13, further comprising moving the UAV to a position within a user's view range according to a direction between the user and the UAV.

* * * * *